United States Patent
Furutani

(10) Patent No.: US 8,188,931 B2
(45) Date of Patent: May 29, 2012

(54) ELECTRONIC DEVICE, ANTENNA AND ARTICLE

(75) Inventor: Nagahisa Furutani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 12/816,727

(22) Filed: Jun. 16, 2010

(65) Prior Publication Data

US 2010/0253583 A1   Oct. 7, 2010

Related U.S. Application Data

(63) Continuation of application No. PCT/JP2008/050032, filed on Jan. 7, 2008.

(51) Int. Cl.
*H01Q 1/24* (2006.01)

(52) U.S. Cl. ................................. 343/702; 343/700 MS

(58) Field of Classification Search .................. 343/700, 343/702, 846
See application file for complete search history.

(56) References Cited

U.S. PATENT DOCUMENTS

| | | | | |
|---|---|---|---|---|
| 4,751,513 | A * | 6/1988 | Daryoush et al. | 343/700 MS |
| 5,608,414 | A * | 3/1997 | Amore | 343/700 MS |
| 6,140,966 | A * | 10/2000 | Pankinaho | 343/700 MS |
| 6,501,435 | B1 | 12/2002 | King et al. | |
| 6,914,562 | B2 | 7/2005 | Forster | |
| 7,504,998 | B2 * | 3/2009 | Choi et al. | 343/700 MS |
| 7,605,706 | B2 | 10/2009 | Khatri | |
| 7,825,867 | B2 * | 11/2010 | Tuttle | 343/758 |
| 2006/0244605 | A1 | 11/2006 | Sakama et al. | |
| 2006/0255946 | A1 | 11/2006 | Khatri | |
| 2007/0096992 | A1 | 5/2007 | Fujii | |
| 2007/0241200 | A1 | 10/2007 | Sawachi | |
| 2009/0140947 | A1 | 6/2009 | Sasagawa et al. | |

FOREIGN PATENT DOCUMENTS

| | | |
|---|---|---|
| JP | 11-261330 A | 9/1999 |
| JP | 2001-060902 A | 3/2001 |
| JP | 2005-191705 A | 7/2005 |
| JP | 2006-311372 A | 11/2006 |
| JP | 2006-319496 A | 11/2006 |
| JP | 2006-319964 A | 11/2006 |
| JP | 2007-124328 A | 5/2007 |
| JP | 2007-312354 A | 11/2007 |

(Continued)

OTHER PUBLICATIONS

M. Eunni et al, "A Novel Planar Microstrip Antenna Design for UHF RFID", Information and Technology Centre, University of Kansas, Jun. 25, 2005,(http://www.ittc.ku.edu/~deavours/pubs/ccct06.pdf).

(Continued)

*Primary Examiner* — Tho G Phan
(74) *Attorney, Agent, or Firm* — Westerman, Hattori, Daniels & Adrian, LLP

(57) ABSTRACT

An electronic device includes an antenna and a semiconductor element. The antenna includes a first conductor section that includes a first feeding point and spreads flatly, and a second conductor section that includes a second feeding point and spreads flatly while facing the first conductor section, the first conductor section and the second conductor section being disposed so as to be symmetric with respect to a plane, including a position of the first feeding point and a position of the second feeding point. The semiconductor element supplies the first feeding point and the second feeding point with signals opposite to each other in polarity, respectively, thereby communicating via the antenna.

10 Claims, 24 Drawing Sheets

FOREIGN PATENT DOCUMENTS

WO  2006/049068 A1  5/2006

OTHER PUBLICATIONS

"KUTag-a low profile, planar, microstrip UHF RFID tag", Jun. 25, 2005, (http://www.ittc.ku.edu/~deavours/kutag.html).

News Announcement. "A Cloth Electronic Tag Capable of Being Directly Attached to a Curved Metal Surface . . . ", Feb. 24, 2006. (http://www.ww2.nict.go.jp/pub/whatsnew/press/h17/060224/060224.html).

"UHF KU-RFID Tag", Information & Telecommunication Technology Center, The University of Kansas, Jun. 25, 2005, (http://www.ittc.ku.edu/publications/KU-Tag_flyer.pdf).

C. Swedberg, "University of Kansas' Tag for Metal, Liquids, " RFID Journal, Apr. 19, 2006 (http://www.rfidjournal.com/article/articleprint/2275/-1/1).

International Search Report of PCT/JP2008/050032, mailing date of Apr. 8, 2008.

Notification of Transmittal of Copies Translation of the International Preliminary Report on Patentability (Form PCT/IB/338) of International Application No. PCT/JP2008/050032 mailed Sep. 16, 2010 with Forms PCT/IB/373 and PCT/ISA/237.

* cited by examiner

RELATED ART

RELATED ART

RELATED ART

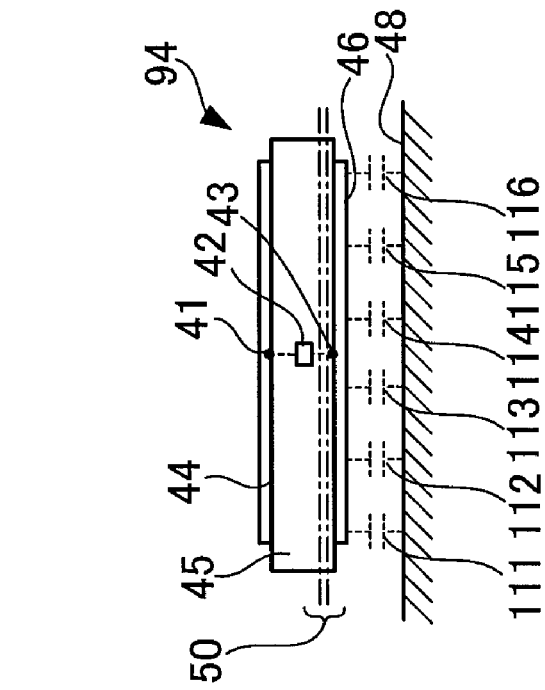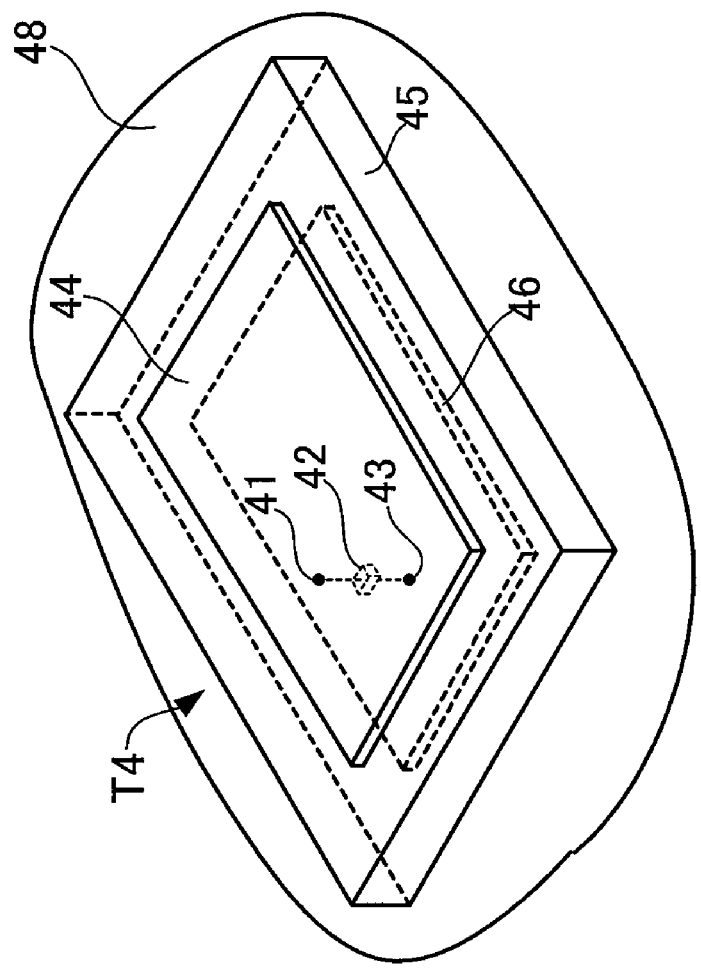

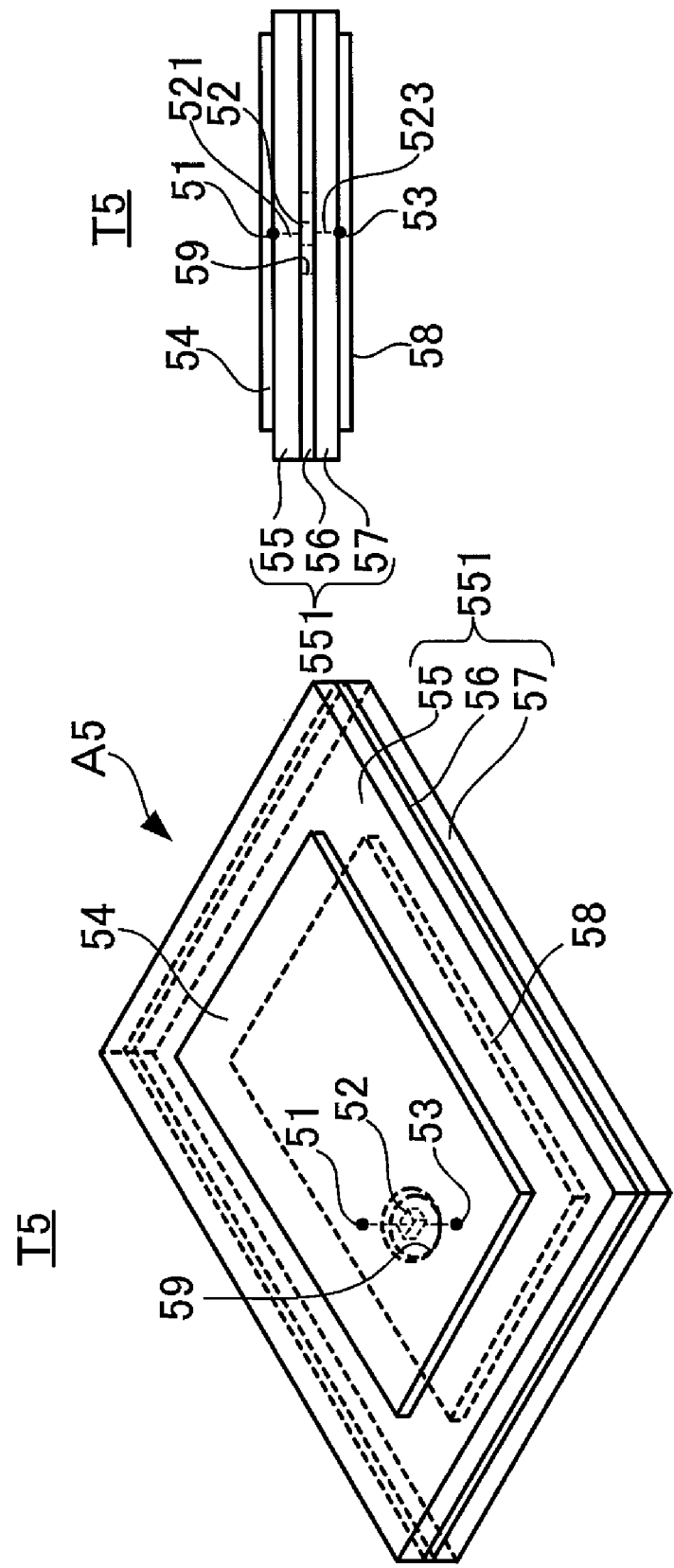

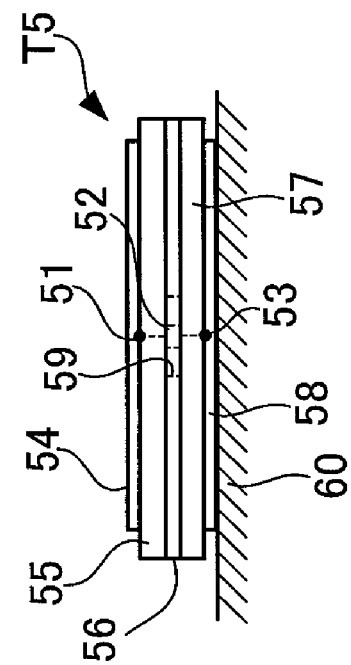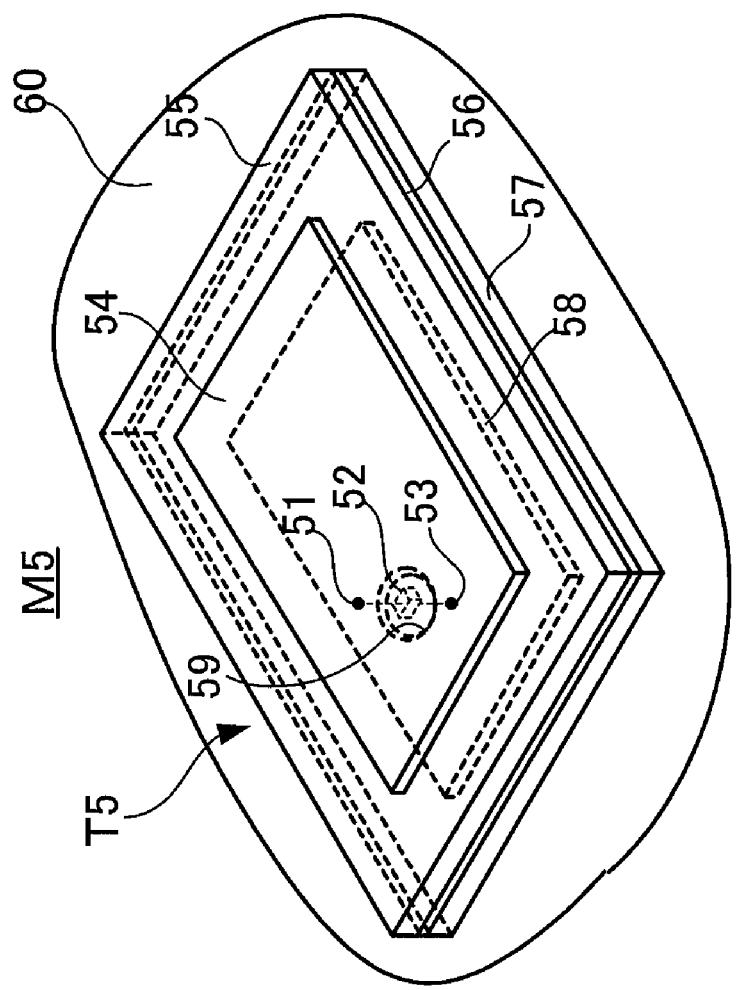

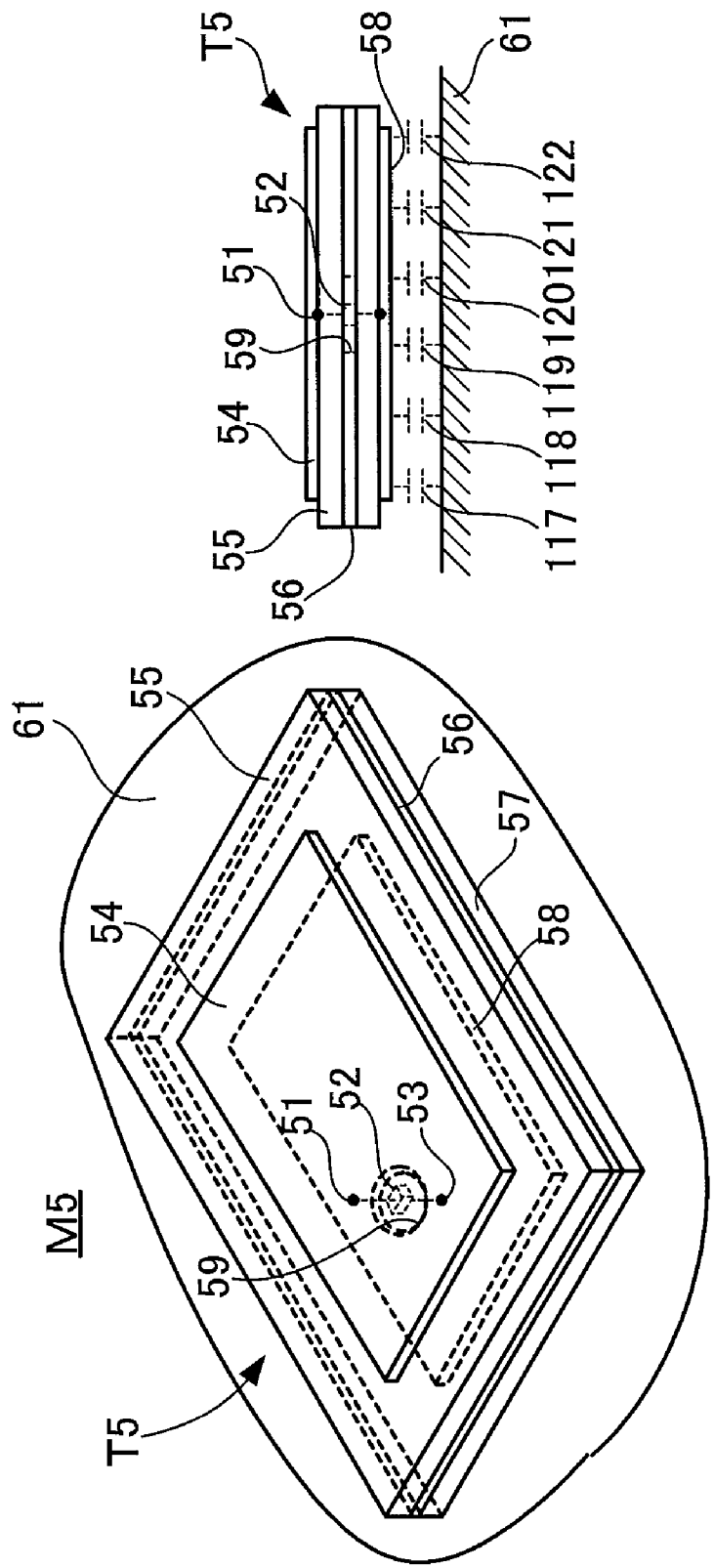

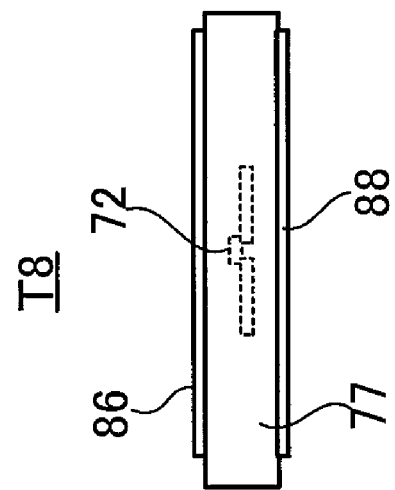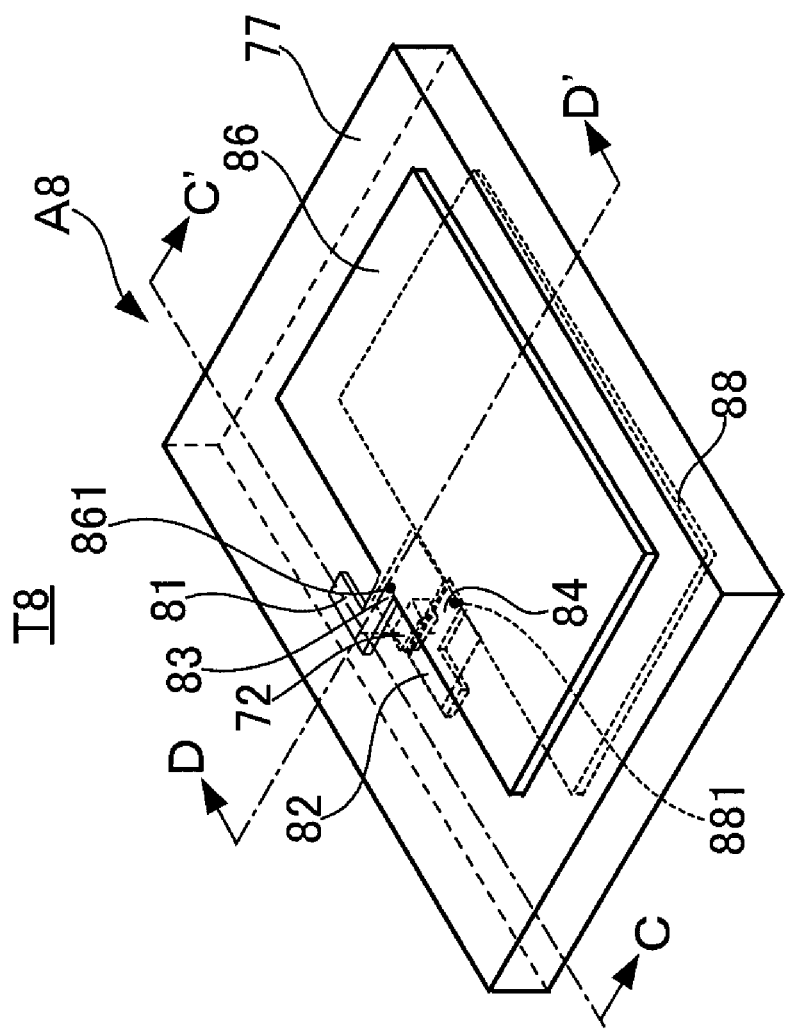

A16

A18

T19   A19

ELECTRONIC DEVICE, ANTENNA AND ARTICLE

CROSS-REFERENCE TO RELATED APPLICATION

This is a continuation application of PCT/JP2008/050032, filed on Jan. 7, 2008.

FIELD

The embodiments discussed herein are related to an electronic device that performs wireless communication, an antenna, and an article to which the electronic device is attached.

BACKGROUND

Electronic devices that perform wireless communications are each provided with an antenna compliant with a communication method, and various antennas have been developed to meet diversification of the communication method.

For example, techniques related to Radio Frequency Identification (RFID), in which various kinds of information about an article is recorded in an IC chip and read out by radio, have been developed to realize article management such as inventory management, merchandise management and distribution management set as a target. In an RFID system, an RFID tag attached to an object has an antenna and a memory where information about the object is accumulated. A reader/writer connected to a host computer reads the information from the RFID tag and transmits the read information to the host computer by using radio signals. Conversely, the reader/writer writes information transmitted from the host computer into the memory of the RFID tag by using radio signals. Traceability of the object is improved by the RFID system. Moreover, work labor is reduced in comparison with conventional management that employs display of letters and signs.

An article to which an RFID tag is attached is desired to be as small as possible or to be thin and thus, an antenna used for the RFID tag generally includes a strip line. The antenna including the strip line is called a microstrip antenna. Main antennas include a dipole antenna, a folded dipole antenna, a patch antenna and a bowtie antenna.

FIG. 1 is an external view of an example of the structure of a microstrip antenna based on a conventional technique, and FIGS. 2A and 2B are diagrams for describing an operation of the antenna illustrated in FIG. 1. FIG. 2A schematically illustrates the antenna together with an electric field, and FIG. 2B illustrates an electric field intensity in a graph. Further, FIGS. 3A and 3B are diagrams that illustrate an electric field distribution and a magnetic field distribution, respectively, of the antenna illustrated in FIG. 1. FIG. 3A illustrates an electric field distribution and FIG. 3B illustrates a magnetic field distribution, when the antenna is viewed in a direction perpendicular to an antenna element.

An antenna A1 illustrated in FIG. 1 is a rectangular microstrip antenna and has a ground 3, a dielectric substrate 4 and an antenna element 1. A feeder line 5 is connected to a feeding point 2 of the antenna element 1, and the feeder line 5 penetrates the dielectric substrate 4. A high frequency signal is supplied from the feeding point 2 to the antenna element 1 through the feeder line 5 and emitted as a radio wave. At this time, as illustrated in FIG. 2A, an electric field is produced along arrows 7 and between the antenna element 1 and a map 9 of an antenna element virtually assumed within the ground 3. Also, at a certain moment, an electric field is produced as indicated by arrows 10 in FIG. 2B between the antenna element 1 and the map 9, and the electric field has an intensity as indicated by the graph in FIG. 2B. Furthermore, around the antenna element 1, an electric field is produced along arrows 11 illustrated in FIG. 3A, and a magnetic field is produced along arrows 12 illustrated in FIG. 3B.

RFID tags are attached to many kinds of object, and the object may be made of metal, organism or liquid that readily affect radio waves. Therefore, the antenna of the RFID tag is desired: (1) to be small and (2) to be capable of sufficiently maintaining a property even when being placed near metal, organism or liquid. In particular, as to the desire (2), ideally, the antenna of the RFID tag that receives radio waves from a reader/writer has a property that does not depend on an environment in which the RFID tag is attached. Actually however, in a state in which metal is brought close to the RFID tag or when the RFID tag is attached to the metal, the property of the antenna greatly deteriorates so that a distance that enables communications with the reader/writer may not be maintained.

In view of such a situation, a RFID tag called a cloth tag (for example, see http://www2.nict.go.jp/pub/whatsnew/press/h17/060224/060224.html) and a RFID tag called a KU-Tag (for example, see http://www.ittc.ku.edu/~deavours/kutag.html, http://www1.rfidjournal.com/article/articleprint/2275/-1/1/, http://www.ittc.ku.edu/publications/KU-Tag_flyer.pdf, and http://www.ittc.ku.edu/~deavours/pubs/ccct06.pdf) have been proposed as applications of the microstrip antenna illustrated in FIG. 1. These RFID tags are configured not to be affected by the material of an attachment surface, by a principle of using a ground surface as the attachment surface.

FIG. 4 and FIG. 5 are external views of RFID tags based on conventional techniques. FIG. 4 illustrates the RFID tag having a ground surface as an attachment surface, and FIG. 5 illustrates an example of the KU-Tag in which a semiconductor chip is connected to two points of an antenna element.

An RFID tag T2 illustrated in FIG. 4 includes a rectangular microstrip antenna, and specifically includes: an antenna element 24, a ground 26, a first dielectric substrate 25 disposed between the antenna element 24 and the ground 26, and a second dielectric substrate 27 to be interposed between an object to which the RFID tag T2 is to be attached and the ground 26. The RFID tag T2 further includes a semiconductor chip 22 electrically connected to a feeding point 21 on the antenna element 24 and to a feeding point 23 on the ground 26 and wirelessly communicating via the antenna. The semiconductor chip 22 supplies signals to the antenna element 24 and the ground 26 (unbalanced power supply). In the RFID tag T2, of the antenna element 24 and the ground 26, the ground 26 is attached to the object so that influence of the material of the object is suppressed.

An RFID tag T3 illustrated in FIG. 5 includes: an antenna element 31, a ground 33, a first dielectric substrate 32 interposed between the antenna element 31 and the ground 33, a second dielectric substrate 35 to be interposed between an object to which the RFID tag T3 is to be attached and the ground 33, and a semiconductor chip 29, which are similar to the RFID tag T2 in FIG. 4. However, in the RFID tag T3 illustrated in FIG. 5, the semiconductor chip 29 is electrically connected to two points at one side of the antenna element 31 in a rectangular shape, which is different from the RFID tag T2 in FIG. 4. A signal is supplied from the semiconductor chip 29 to the antenna element 31 via feed patterns 28 and 30 (balanced power supply). In the RFID tag T3 as well, the ground 33 is attached to an object so that influence of the material of the object is suppressed.

Also, as an antenna that suppresses influence of the material of an object, there have been proposed antennas that each function as a slot antenna in a state of being brought close to a metal face and function as a normal antenna when being moved away from the metal face (for example, see U.S. Pat. No. 6,914,562 and No. 6,501,435)

However, each of the RFID tags illustrated in FIG. 4 and FIG. 5 may not be always attached to the metal face, and when, for example, the RFID tag is attached to a material other than the metal, the ground of the RFID tag is not in a state of a short with respect to a peripheral ground potential. In other words, impedance in the ground of the RFID tag may not always short with respect to the peripheral ground potential, and still depends on a condition of the material of the object. For this reason, in an attempt to enlarge the ground to the extent that the property of the antenna is not impaired, the size of the RFID tag is increased and falls outside a practically acceptable range. It is generally desirable in practical use that the size of the RFID tag be equal to or less than a business card, but it is difficult to realize this size with the RFID tags illustrated in FIG. 4 and FIG. 5.

Further, the antenna, which functions as the slot antenna when being brought close to the metal face and functions as the normal antenna when being moved away from the metal face, has a complicated structure, making it difficult to reduce the size. Moreover, this problem is not limited to the RFID tag and rather a common problem among electronic devices that each performs wireless communication through an antenna.

SUMMARY

According to an aspect of the invention, an electronic device includes an antenna and a semiconductor element. The antenna includes a first conductor section that includes a first feeding point and spreads flatly, and a second conductor section that includes a second feeding point and spreads flatly while facing the first conductor section, the first conductor section and the second conductor section being disposed so as to be symmetric with respect to a plane, including a position of the first feeding point and a position of the second feeding point. The semiconductor element supplies the first feeding point and the second feeding point with signals opposite to each other in polarity, respectively, thereby communicating via the antenna.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B are diagrams that illustrate a part of the article near which the RFID tag illustrated in FIGS. 6A and 6B is attached;

FIGS. 9A and 9B are diagrams that illustrate an RFID tag according to a second embodiment of the electronic device;

FIGS. 10A and 10B are diagrams that illustrate a part of an article to which the RFID tag illustrated in FIGS. 9A and 9B is intimately attached;

FIGS. 11A and 11B are diagrams that illustrate a part of an article to which the RFID tag illustrated in FIGS. 9A and 9B is attached nearby;

FIGS. 15A and 15B are diagrams that illustrate an RFID tag according to a fourth embodiment of the electronic device;

DESCRIPTION OF EMBODIMENTS

Embodiments of the electronic device, the antenna and the article according to the above-described basic aspects will be described as follows with reference to the drawings.

Figure 6B:
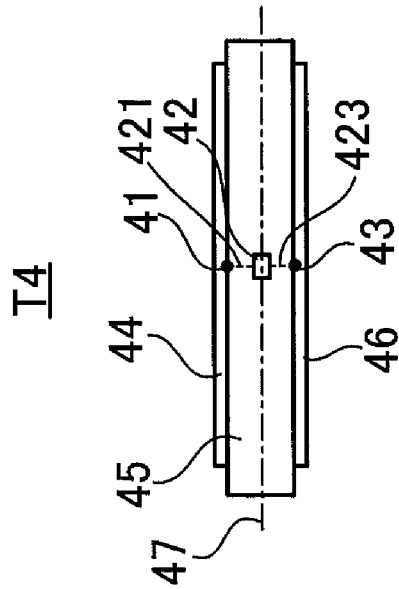
FIGS. 6A and 6B are diagrams that illustrate a RFID tag that is a first embodiment of the electronic device.
Figure 6A:
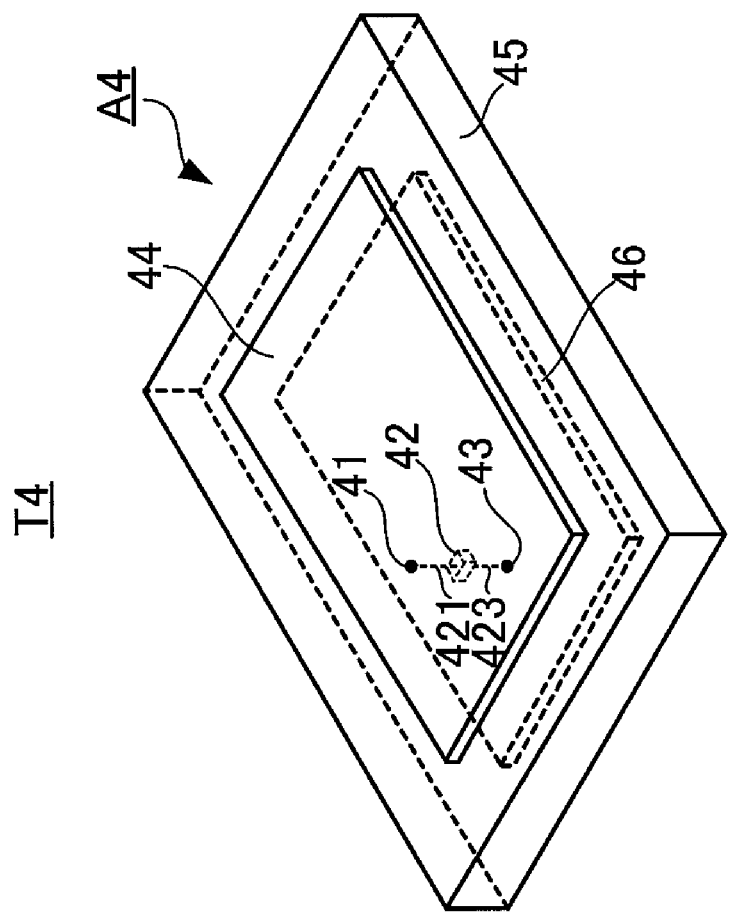

FIGS. 6A and 6B are diagrams that illustrate an RFID tag according to a first embodiment of the electronic device. FIG. 6A is a perspective view and FIG. 6B is a side view of the RFID tag.

An RFID tag T4 illustrated in FIGS. 6A and 6B includes an antenna A4, a semiconductor chip 42 that wirelessly communicates with the outside through the antenna A4, and two lead wires 421 and 423 that electrically connect the semiconductor chip 42 to the antenna A4. The antenna A4 includes a first antenna element 44 spreading flatly, a second antenna element 46 spreading flatly while facing the first antenna element 44, and a dielectric substrate 45 shaped like a plate and interposed between the first antenna element 44 and the second antenna element 46.

Here, the antenna A4 is equivalent to an example of the antenna according to the basic aspect, the first antenna element 44 is equivalent to an example of the first conductor section according to the basic aspect, the second antenna element 46 is equivalent to an example of the second conductor section according to the basic aspect, and the semiconductor chip 42 is equivalent to an example of the semiconductor element according to the basic aspect.

The first antenna element 44 and the second antenna element 46 are disposed to be symmetric with respect to a virtual symmetry plane 47 located at a midpoint between the first antenna element 44 and the second antenna element 46. Specifically, the first antenna element 44 and the second antenna element 46 are about the same in shape and size, and disposed to be in postures symmetric with respect to the symmetry plane 47. To be more specific, each of the first antenna element 44 and the second antenna element 46 is rectangular. Further, the first antenna element 44 is provided with a first feeding point 41, and the second antenna element 46 is provided with a second feeding point 43. The semiconductor chip 42 is electrically connected to the first feeding point 41 and the second feeding point 43 through the lead wires 421 and 423, respectively. Including the positions of the first feeding point 41 and the second feeding point 43, the first antenna element 44 and the second antenna element 46 are symmetric with respect to the plane 47.

In the RFID tag T4, the semiconductor chip 42 is embedded in the dielectric substrate 45, and disposed at an equal and shortest distance from each of the first feeding point 41 and the second feeding point 43, namely at the midpoint between the first feeding point 41 and the second feeding point 43. When the semiconductor chip 42 is in a receiving state, an electrical signal is transmitted from each of the first feeding point 41 and the second feeding point 43 to the semiconductor chip 42. The semiconductor chip 42 operates by the electric power of this electrical signal. Conversely, when the semiconductor chip 42 is in a transmission state, the semiconductor chip 42 supplies the first feeding point 41 and the second feeding point 43 with electrical signals opposite to each other in polarity. The semiconductor chip 42 has a memory and stores information sent from a reader/writer (not illustrated) and arrived via the antenna A4 into the memory. Also, the semiconductor chip 42 reads the stored information from the memory, and transmits the read information to the reader/writer via the antenna A4. When the RFID tag T4 is attached to an article main body that will be described later, the RFID tag T4, specifically, the semiconductor chip 42 holds information that belongs to the article main body, and the RFID tag T4 sends and receives the information via the antenna A4 to and from an external reader/writer.

The RFID tag T4 illustrated in FIGS. 6A and 6B may be produced by, for example, forming the dielectric substrate 45 shaped like a plate by: embedding the semiconductor chip 42 to which the lead wires 421 and 423 are connected in a resin material; forming a metal film on front and back surfaces of the dielectric substrate 45; and etching this metal film, thereby forming the first antenna element 44 and the second antenna element 46. Further, although illustration is omitted, the entire RFID tag T4 may be coated with resin or the like. By providing a structure in which the dielectric substrate 45 is interposed between the first antenna element 44 and the second antenna element 46, even when the RFID tag T4 is reduced in size and thickness, the relation between the position of the first antenna element 44 and that of the second antenna element 46 is maintained simply and reliably. The position of the first feeding point 41 in the first antenna element 44 and the position of the second feeding point 43 in the second antenna element 46 affect the impedance characteristic of the antenna A4. Setting of the positions of feeding points 41 and 43 will be described later.

Figure 7B:
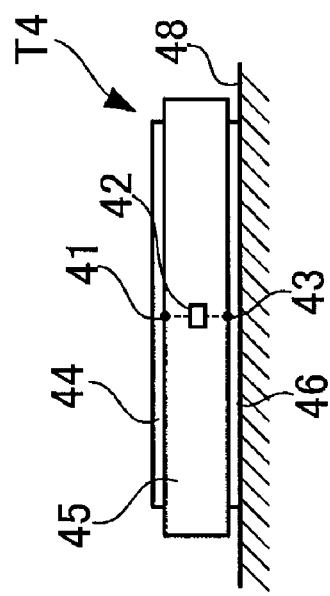
FIGS. 7A and 7B are diagrams that illustrate a part of an article to which the RFID tag illustrated in FIGS. 6A and 6B is intimately attached.
Figure 7A:
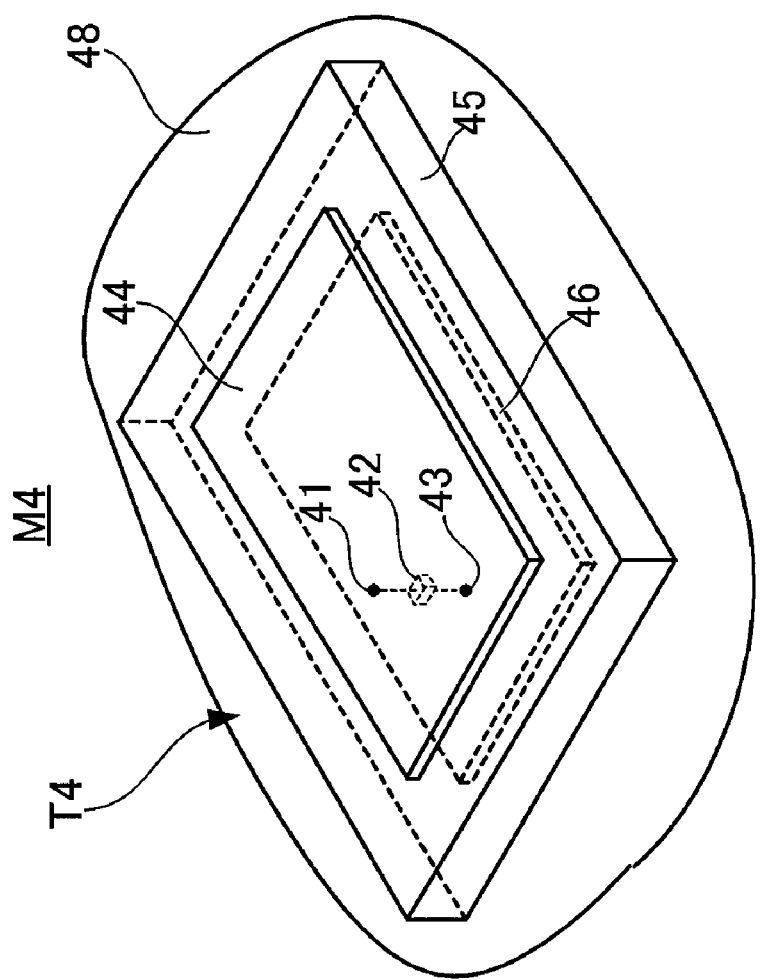

FIGS. 7A and 7B are diagrams that illustrate a part of an article to which the RFID tag illustrated in FIGS. 6A and 6B is intimately attached. FIG. 7A is a partial perspective view of the article, and FIG. 7B illustrates a side of the RFID tag and a partial cross section of a main body of the article.

An article M4 illustrated in FIGS. 7A and 7B includes an article main body 48 and the RFID tag T4 attached to the article main body 48.

Figure 1:
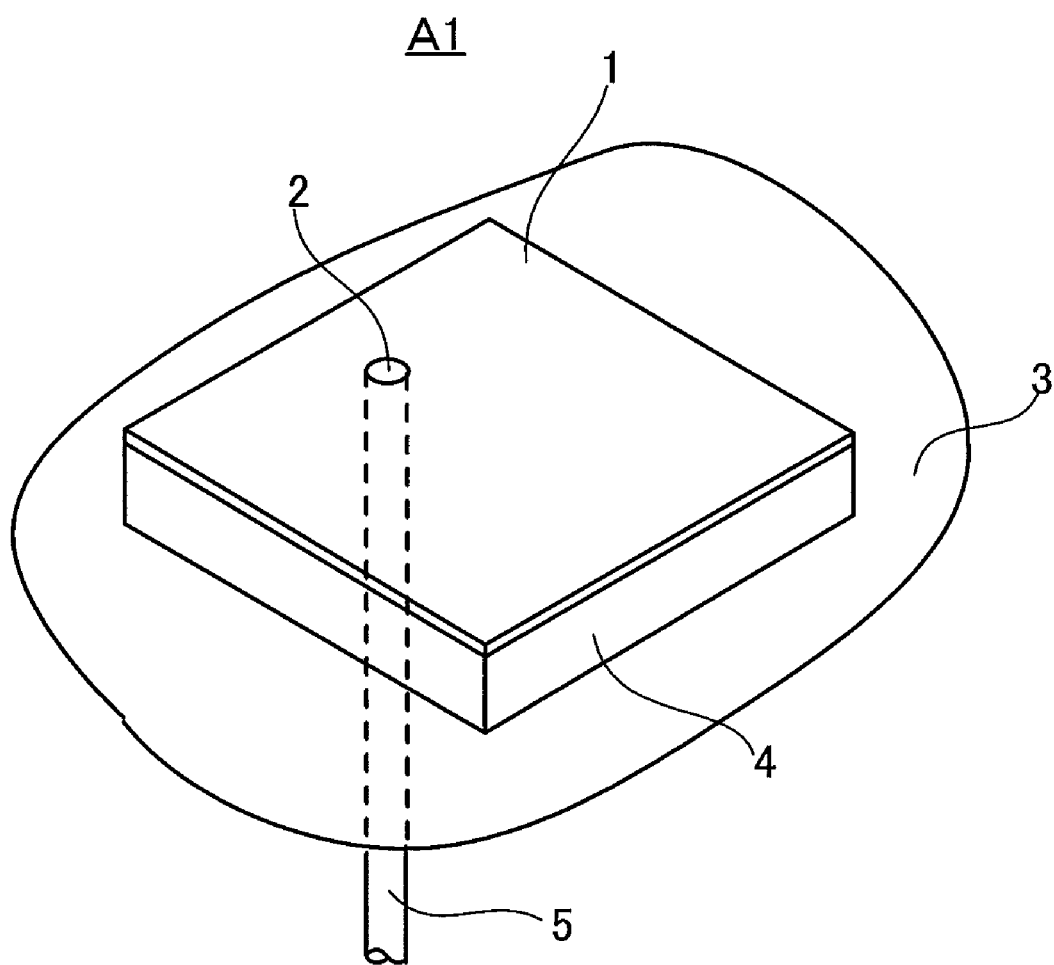
FIG. 1 is an external view of an example of the structure of a microstrip antenna based on a conventional technique.
Figure 2A:
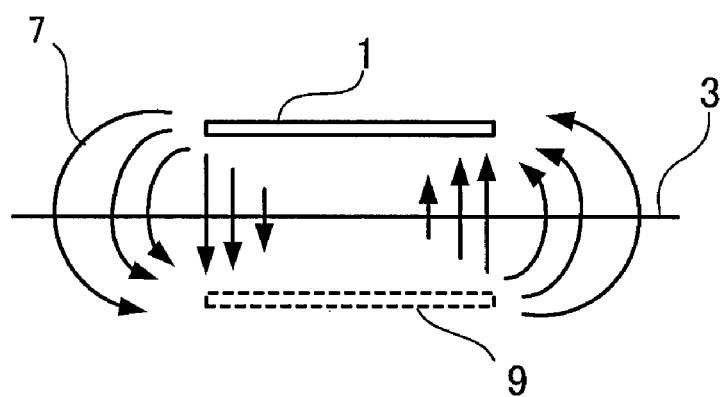
FIGS. 2A and 2B are diagrams for describing an operation of the antenna illustrated in FIG. 1.
Figure 2B:
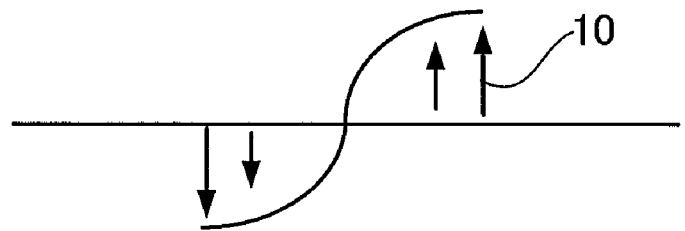
Figure 3A:
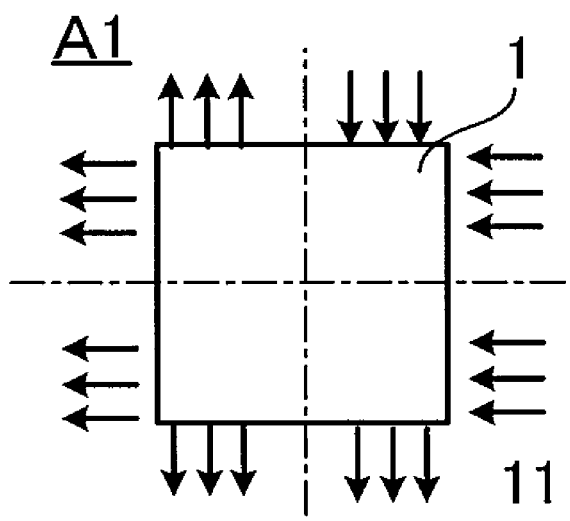
FIGS. 3A and 3B are diagrams that illustrate an electric field distribution and a magnetic field distribution, respectively, of the antenna illustrated in FIG. 1.
Figure 3B:
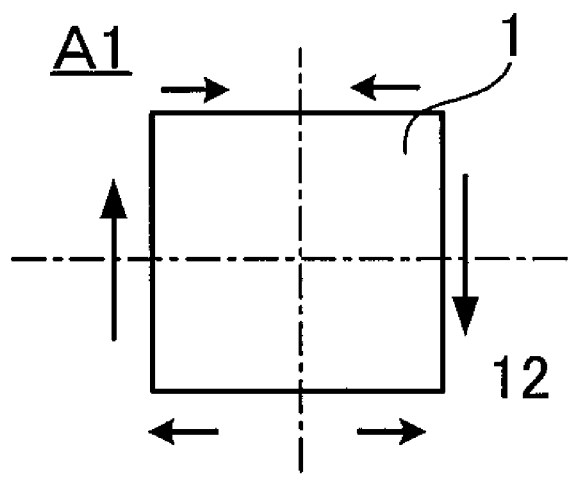
Figure 4:
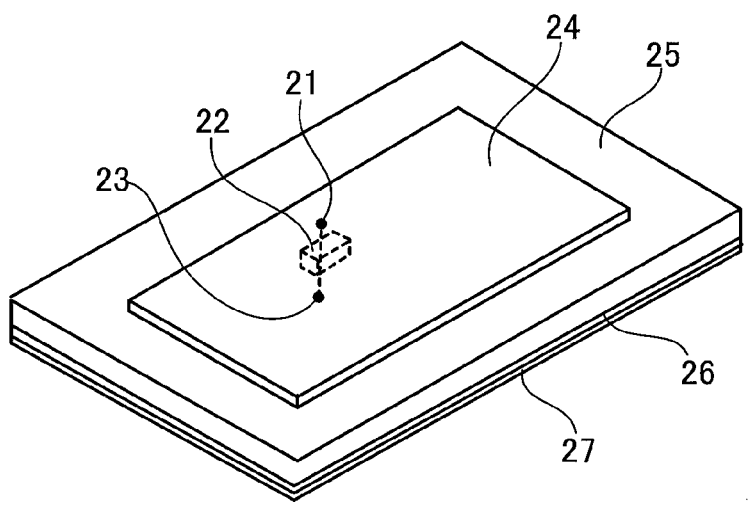
FIG. 4 is an external view of an RFID tag having a ground surface as an attachment surface based on a conventional technique.
Figure 5:
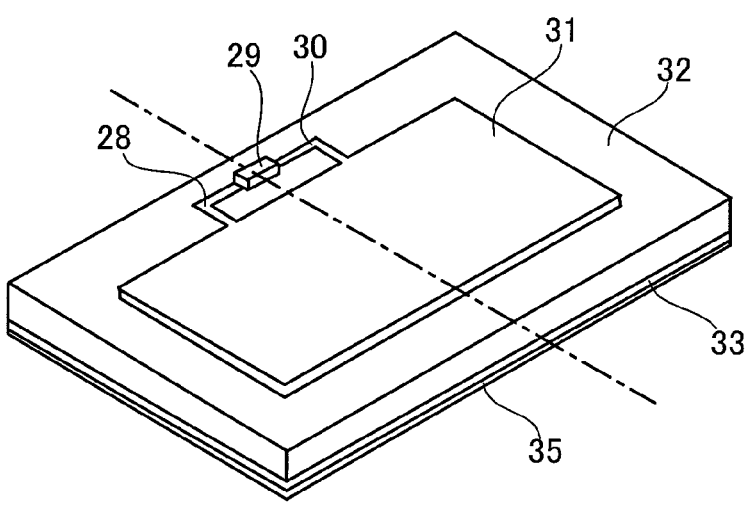
FIG. 5 is an external view of an example of the KU-Tag in which a semiconductor chip is connected to two points of an antenna element based on a conventional technique.

Here, the article main body 48 is a metallic ornament, and the RFID tag T4 receives and transmits, from and to the outside, information that presents the attribute of the article main body 48 such as a manufacturer identification code and a production lot number of the ornament. The RFID tag T4 is in a state in which the second antenna element 46 is adhered to the article main body 48. In this state, the second antenna element 46 is in contact with and thus electrically integral with the article main body 48, thereby functioning as a ground. Even when the surface of the RFID tag T4 is coated with resin or the like, in the state illustrated in FIGS. 7A and 7B, the second antenna element 46 and the article main body 48 are extremely close to each other via a coating layer, and the second antenna element 46 is in a condition of a short in terms of alternating current with respect to the article main body 48, thereby becoming integral with the article main body 48 and functioning as the ground. Therefore, in the state illustrated in FIGS. 7A and 7B, the antenna A4 (see FIGS. 6A and 6B) of the RFID tag T4 operates as a microstrip antenna, by using the first antenna element 44 as an antenna element for radio wave emission and using the second antenna element 46 and the article main body 48 as a ground plane. In other words, the RFID tag T4 operates like the conventional antennas illustrated in FIG. 1 and FIG. 4, and the power supply from the semiconductor chip 42 is in an unbalanced power supply state. The respective sizes and shapes of the first antenna element 44 and the second antenna element 46 and the respective positions of the feeding points 41 and 43 in the RFID tag T4 are optimized to meet the property of the RFID tag T4 when the RFID tag T4 operates as the microstrip antenna in the state illustrated in FIGS. 7A and 7B. To be more specific, for an instance, the respective positions of the feeding points 41 and 43 in the first antenna element 44 and the second antenna element 46 are set so that the impedance of the antenna in the state illustrated in FIGS. 7A and 7B agrees with the input and output impedance of the semiconductor chip 42.

Here, when, for example, the RFID tag T4 is attached to the article main body while keeping a distance from the article main body such as when hung with a string, or when the RFID tag T4 is adhered to a non-conductive part of the article main body, the RFID tag T4 is in such a state that no conductive object such as metal is present around the RFID tag T4. The description will be continued assuming FIGS. 6A and 6B illustrate this state. In the state in which no conductive object is present around the RFID tag T4 as illustrated in FIGS. 6A and 6B, the RFID tag T4 operates as the microstrip antenna in which a planar virtual ground is assumed to be at the position of the symmetry plane 47. At this time, the power supply from the semiconductor chip 42 is in a balanced power supply state, and the antenna A4 has a radio-wave emission pattern that is symmetric with respect to the virtual ground, namely the symmetry plane 47. In other words, in the antenna A4, both the first antenna element 44 and the second antenna element 46 emit radio waves. For this reason, unlike the conventional antenna in which a radio wave is mainly emitted in a single direction, the direction of the radio wave is not limited.

FIGS. 8A and 8B are diagrams that illustrate a part of the article near which the RFID tag illustrated in FIGS. 6A and 6B is attached. FIG. 8A is a partial perspective view of the article, and FIG. 8B illustrates a side of the RFID tag and a cross section of the article main body.

The RFID tag T4 indicates a behavior in a free space when being in the state illustrated in FIGS. 6A and 6B, and indicates such a behavior that one of the antenna elements is in a free space while the other is in the ground when being in the state illustrated in FIGS. 7A and 7B. In the state in which the RFID tag T4 is brought close to the article main body 48 made of metal to the extent of not being in intimate contact with the article main body 48 as illustrated in FIGS. 8A and 8B, the RFID tag T4 indicates an intermediate behavior between the behavior described with reference to FIGS. 6A and 6B and the behavior described with reference to FIGS. 7A and 7B. To be more specific, in the state illustrated in FIGS. 8A and 8B, a parasitic capacitance made up of stray capacitances 111, 112, 113, 114, 115 and 116 is produced between the second antenna element 46 and the article main body 48, and the second antenna element 46 and the ground are connected to each other via the stray capacitances 111 through 116. In this state, a virtual ground 50 of the antenna is assumed to be positioned close to the article main body 48, to be more specific, close to the article main body 48 according to the distance between the RFID tag T4 and the article main body 48. It is considered that the intermediate behavior occurs for this reason.

The relation between the RFID tag T4 and the article main body may be in any of the states illustrated FIGS. 6A and 6B, FIGS. 7A and 7B and FIGS. 8A and 8B, depending on how the RFID tag T4 is attached to the article. The first antenna element 44 and the second antenna element 46 of the RFID tag T4 are disposed to face each other and be symmetric with respect to the plane. Therefore, by supplying the first antenna element 44 and the second antenna element 46 with signals opposite to each other in polarity, in the state illustrated in FIGS. 6A and 6B, the virtual ground plane is formed at the midpoint between the first antenna element 44 and the second antenna element 46, and radio waves having sufficient intensities are emitted from both of the first antenna element 44 and the second antenna element 46. Further, when the RFID tag T4 is attached to adhere to the article main body 48 made of a metal material as illustrated in FIGS. 7A and 7B, one of the first antenna element 44 and the second antenna element 46, which faces the metal material, functions as the ground and operates as a microstrip antenna similar to the conventional ones. Each of the first antenna element 44 and the second antenna element 46 is formed to be in a size according to a communication frequency band and thus is small as a ground plane, but the article main body is caused to function as a ground and thus the ground is sufficiently ensured. Therefore, radio waves are emitted at sufficient intensity. Further, even in an intermediate state in which the RFID tag T4 is attached near but not adhered to the metal material as illustrated in FIGS. 8A and 8B, the RFID tag T4 operates in an intermediate state between the state illustrated in FIGS. 6A and 6B and the state illustrated in FIGS. 7A and 7B and therefore, radio waves are emitted at sufficient intensity. Therefore, the RFID tag T4 is not easily affected by the material of the object to which the RFID tag T4 is attached, and radio waves of sufficient intensity are emitted while the RFID tag T4 is in any of the states illustrated in FIGS. 6A and 6B, FIGS. 7A and 7B and FIGS. 8A and 8B, which ensures a sufficient communication distance. Furthermore, since there is no need to enlarge one of the antenna elements, the size of the entire RFID tag T4 may be reduced.

Next, a second embodiment of the electronic device will be described. In the following description of the second embodiment, the same elements as those of the embodiment described above will be not described, and only the difference will be described.

FIGS. 9A and 9B are diagrams that illustrate an RFID tag according to the second embodiment of the electronic device. FIG. 9A is a perspective view and FIG. 9B is a side view of the RFID tag.

Like the RFID tag T4 illustrated in FIGS. 6A and 6B, an RFID tag T5 illustrated in FIGS. 9A and 9B also includes an antenna A5, feeding points 51, 53, a semiconductor chip 52 and lead wires 521 and 523, and the antenna A5 includes a first antenna element 54, a second antenna element 58 and a dielectric substrate 551. However, the RFID tag T5 illustrated in FIGS. 9A and 9B is different from the RFID tag T4 illustrated in FIGS. 6A and 6B in that the RFID tag T5 includes a conductor layer 56 disposed within the dielectric substrate 551. To be more specific, the dielectric substrate 551 has such a structure that the conductor layer 56 is interposed between two dielectric sections 55 and 57 each shaped like a plate, and the conductor layer 56 is disposed at the midpoint between the first antenna element 54 and the second antenna element 58. A hole 59 for avoiding an interference with the semiconductor chip 52 is formed in the conductor layer 56, and the semiconductor chip 52 is disposed in the hole 59.

FIGS. 10A and 10B are diagrams that illustrate a part of an article to which the RFID tag illustrated in FIGS. 9A and 9B is intimately attached. FIG. 10A illustrates a partial perspective view of the article, and FIG. 10B illustrates a side of the RFID tag and a partial cross section of an article main body.

In a state illustrated in FIGS. 10A and 10B, the second antenna element 46 is in contact with and thus electrically integral with an article main body 60, thereby functioning as a ground. At this time, like the case described with reference to FIGS. 7A and 7B, the antenna A5 (see FIGS. 9A and 9B) of the RFID tag T5 operates as a microstrip antenna by using the first antenna element 54 as an antenna element for emitting radio waves and by using the second antenna element 58 and the article main body 60 as a ground plane.

FIGS. 11A and 11B are diagrams that illustrate a part of an article to which the RFID tag illustrated in FIGS. 9A and 9B is attached nearby. FIG. 11A is a partial perspective view of an article M5, and FIG. 11B illustrates a side of the RFID tag and a partial cross section of an article main body.

When the RFID tag T5 is attached near the article main body as illustrated in FIGS. 11A and 11B, a parasitic capacitance made up of stray capacitances 117, 118, 119, 120, 121 and 122 is produced between the second antenna element 58 and an article main body 61, so that the second antenna element 58 and a ground are in a state of being connected to each other via the stray capacitances 117 through 122. In this state, a virtual ground of the antenna is assumed to be present at a position closer to the article main body 61, but the conductor layer 56 disposed at the midpoint between the first antenna element 54 and the second antenna element 58 is dominant. Therefore, the antenna A5 has a radio-wave emission pattern symmetric with respect to the conductor layer 56 and thus, the direction of a radio wave is not easily restricted.

Next, a third embodiment of the electronic device will be described. In the following description of the third embodiment, the same elements as those of the embodiments described above will not be described, and only features different from the former embodiments will be described.

Figure 12A:
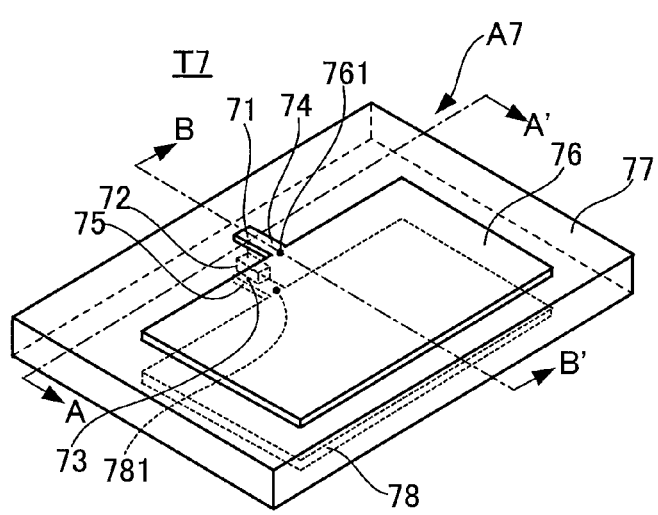
FIGS. 12A and 12B are diagrams that illustrate an RFID tag according to a third embodiment of the electronic device.
Figure 12B:
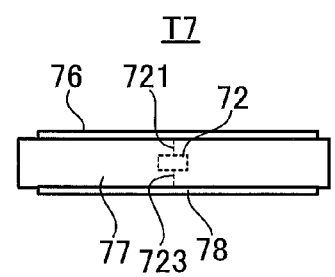
Figure 13:
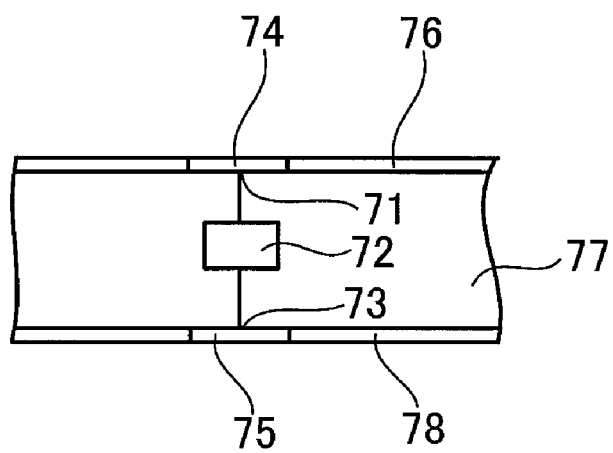
FIG. 13 is a cross-sectional view of the RFID tag taken along a line A-A' illustrated in FIGS. 12A and 12B.
Figure 14:
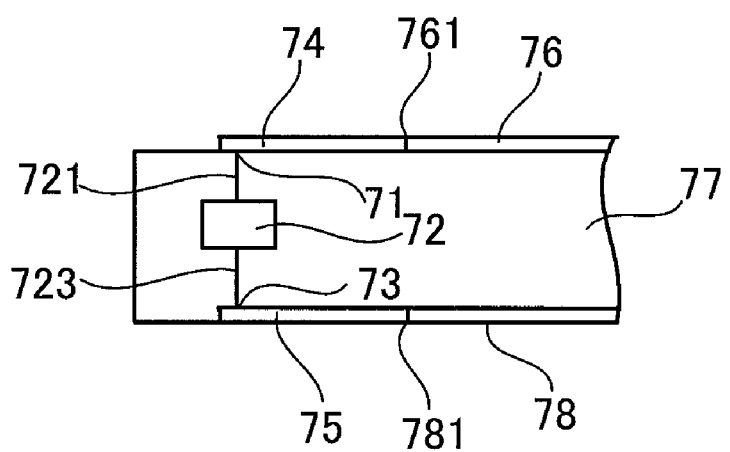
FIG. 14 is a cross-sectional view of the RFID tag taken along a line B-B' illustrated in FIGS. 12A and 12B.

FIGS. 12A and 12B, FIG. 13 and FIG. 14 are diagrams that illustrate an RFID tag according to the third embodiment of the electronic device. FIG. 12A is a perspective view and FIG. 12B is a side view of the RFID tag. Further, FIG. 13 is a cross-sectional view of the RFID tag taken along a line A-A' illustrated in FIGS. 12A and 12B, and FIG. 14 is a cross-sectional view of the RFID tag taken along a line B-B' illustrated in FIGS. 12A and 12B. Incidentally, hatching is omitted in the cross-sectional views for easy viewing.

Like the RFID tag T4 illustrated in FIGS. 6A and 6B, a RFID tag T7 illustrated in FIG. 14 through FIG. 12B also includes an antenna A7, a semiconductor chip 72 and lead wires 721 and 723, and the antenna A7 includes a first antenna element 76, a second antenna element 78 and a dielectric substrate 77. However, in the RFID tag T7 illustrated in FIG. 12A through FIG. 14, the first antenna element 76 has a first feeding point 761 provided at an edge of the first antenna element 76 that flatly spreads, and the second antenna element 78 has a second feeding point 781 provided at an edge of the second antenna element 78 that flatly spreads, which are features different from the RFID tag T4 illustrated in FIGS. 6A and 6B. Further, in the RFID tag T7 illustrated in FIGS. 12A and 12B, the antenna A7 includes: a first feeding pattern 74 protruding from the first feeding point 761 toward the outside of the first antenna element 76; and a second feeding pattern 75 protruding from the second feeding point 781 toward the outside of the second antenna element 78, which are features different from the RFID tag T4. The first feeding pattern 74 and the second feeding pattern 75 are provided with lead connecting points 71 and 73 to which the lead wires 721 and 723 are connected, respectively. A signal transmitted from the semiconductor chip 72 to the lead connecting point 71 through the lead wire 721 is then transmitted to the first feeding point 761 in the first antenna element 76 through the first feeding pattern 74. Also, a signal transmitted from the semiconductor chip 72 to the lead connecting point 73 through the lead wire 723 is then transmitted to the second feeding point 781 of the second antenna element 78 through the second feeding pattern 75. The first feeding pattern 74 and the second feeding pattern 75 are formed to be in the same length, and have the same signal transmission time. In the RFID tag T7 illustrated in FIGS. 12A and 12B, the semiconductor chip 72 may be disposed between the first feeding pattern 74 and the second feeding pattern 75 protruding from the first antenna element 76 and the second antenna element 78, respectively. Therefore, it is easy to dispose the semiconductor chip 72 at an equal distance from each of the first feeding point 761 and the second feeding point 781.

Next, a fourth embodiment of the electronic device will be described. In the following description of the fourth embodiment, the same elements as those of the embodiments described above are indicated by the same reference characters as those of the embodiments described above, and features different from the former embodiments will be described.

Figure 16:
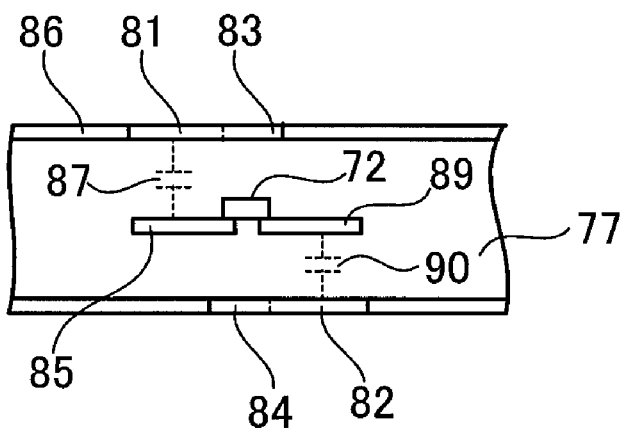
FIG. 16 is a cross-sectional view of the RFID tag taken along a line C-C' illustrated in FIGS. 15A and 15B.
Figure 17:
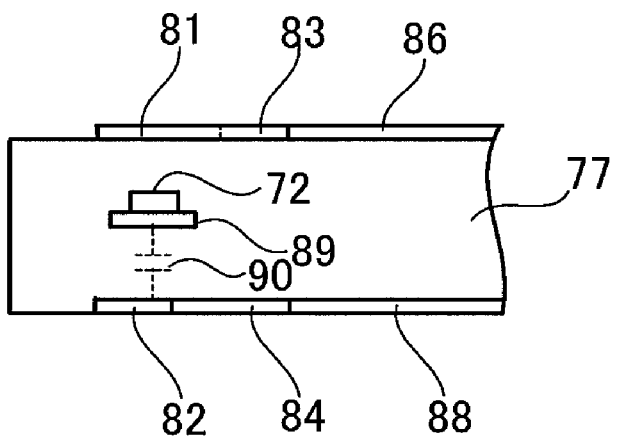
FIG. 17 is a cross-sectional view of the RFID tag taken along a line D-D' illustrated in FIGS. 15A and 15B.

FIGS. 15A and 15B, FIG. 16 and FIG. 17 are diagrams that illustrate an RFID tag according to the fourth embodiment of the electronic device. FIG. 15A is a perspective view and FIG. 15B is a side view of the RFID tag. Further, FIG. 16 is a cross-sectional view of the RFID tag taken along a line C-C' illustrated in FIGS. 15A and 15B, and FIG. 17 a cross-sectional view of the RFID tag taken along a line D-D' illustrated in FIGS. 15A and 15B. Incidentally, hatching is omitted in the cross-sectional views for easy viewing.

Like the RFID tag T7 illustrated in FIG. 12A through FIG. 14, an RFID tag T8 illustrated in FIG. 15A through FIG. 17 includes an antenna A8 and a semiconductor chip 72. The antenna A8 includes a first antenna element 86, a second antenna element 88, a dielectric substrate 77, a first feeding pattern 83 and a second feeding pattern 84. The first feeding pattern 83 and the second feeding pattern 84 protrude from feeding points 861 and 881 of the first antenna element 86 and the second antenna element 88, respectively. However, in the RFID tag T8 illustrated in FIG. 15A through FIG. 17, the first feeding pattern 83 is supplied with a signal through a capacitance and transmits the signal to the first feeding point 861, and the second feeding pattern 84 is supplied with a signal through a capacitance and transmits the signal to the second feeding point 881, which are features different from the RFID tag T7 illustrated in FIGS. 12A and 12B. To be more specific, in the RFID tag T8, the first feeding pattern 83 has a first capacitor electrode 81 at a tip, and the second feeding pattern 84 has a second capacitor electrode 82 at a tip. The first capacitor electrode 81 and the second capacitor electrode 82 extend in opposite directions, from the middle of the first feeding pattern 83 and the middle of the second feeding pattern 84, respectively. Further, in the RFID tag T8, first and second chip mounted electrodes 85 and 89, to which the semiconductor chip 72 is connected, are aligned with a height at the midpoint between the first antenna element 86 and the second antenna element 88, which is a feature different from the RFID tag T7 illustrated in FIGS. 12A and 12B. A part of the first chip mounted electrode 85 is disposed to face the first capacitor electrode 81 and electrically connected to the first capacitor electrode 81 through a capacitance 87. Further, a part of the second chip mounted electrode 89 is disposed to face the second capacitor electrode 82 and electrically connected to the second capacitor electrode 82 through a capacitance 90. The first feeding pattern 83 including the first capacitor electrode 81 and the second feeding pattern 84 including the second capacitor electrode 82 are made to be equal in length. The semiconductor chip 72 is disposed on and thereby bridges the first chip mounted electrode 85 and the second chip mounted electrode 89, thereby establishing direct connection without using a lead wire. In the RFID tag T7, one of the signals emitted from the semiconductor chip 72 is supplied from the first chip mounted electrode 85 to the first capacitor electrode 81 of the first feeding pattern 83 through the capacitance 87. The other of the signals is supplied from the second chip mounted electrode 89 to the second capacitor electrode 82 of the second feeding pattern 84 through the capacitance 90. In this way, the signals are supplied from the semiconductor chip 72 to the first antenna element 86 and the second antenna element 88. Conversely, signals and electric power are supplied from the first antenna element 86 and the second antenna element 88 to the semiconductor chip 72.

Next, a fifth embodiment of the electronic device, which has the elements of the third embodiment and the elements of the second embodiment, will be described. In the following description of the fifth embodiment, the same elements as those of the third embodiment described above are indicated by the same reference characters as those of the third embodiment, and features different from the former embodiments will be described.

Figure 18:
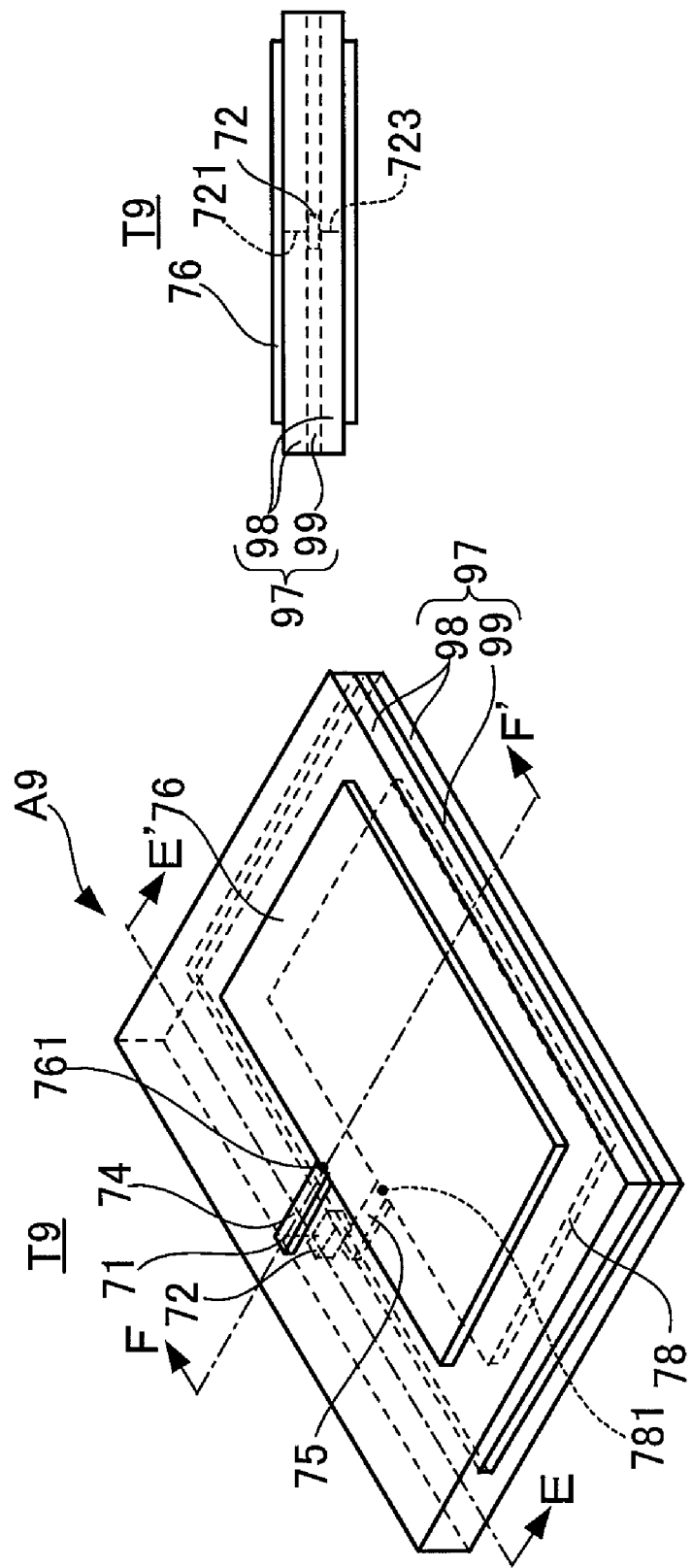
FIGS. 18A and 18B are diagrams that illustrate an RFID tag according to a fifth embodiment of the electronic device.
Figure 19:
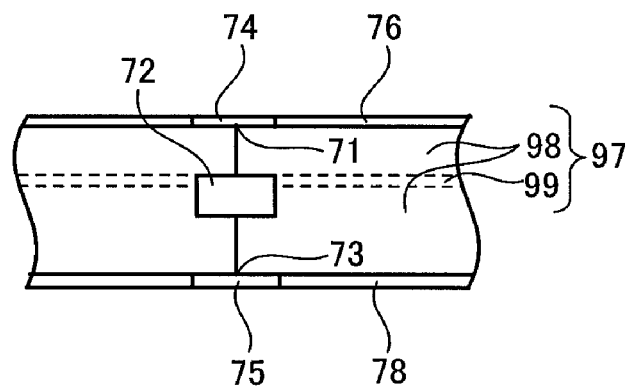
FIG. 19 is a cross-sectional view of the RFID tag taken along a line E-E' illustrated in FIGS. 18A and 18B.
Figure 20:
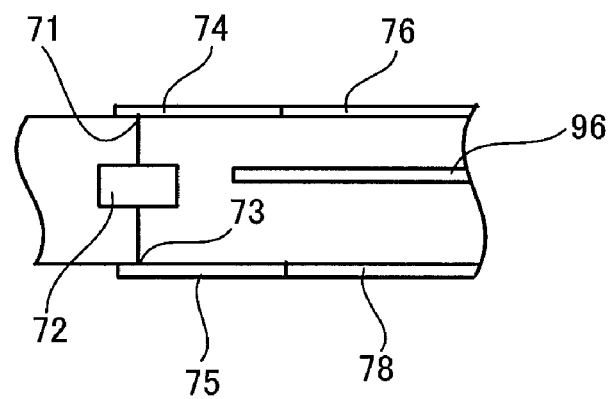
FIG. 20 is a cross-sectional view of the RFID tag taken along a line F-F' illustrated in FIGS. 18A and 18B.

FIGS. 18A and 18B, FIG. 19 and FIG. 20 are diagrams that illustrate an RFID tag according to the fifth embodiment of the electronic device. FIG. 18A is a perspective view and FIG. 18 is a side view of the RFID tag. Further, FIG. 19 is a cross-sectional view of the RFID tag taken along a line E-E' illustrated in FIGS. 18A and 18B, and FIG. 20 is a cross-sectional view of the RFID tag taken along a line F-F' illustrated in FIGS. 18A and 18B.

An RFID tag T9 illustrated in FIG. 18A through FIG. 20 is different from the RFID tag T7 of the third embodiment illustrated in FIGS. 12A and 12B, in that the RFID tag T9 includes a conductor layer 99 disposed within a dielectric substrate 97 of an antenna A9. The dielectric substrate 97 has such a structure that the conductor layer 99 is interposed between parts of a dielectric section 98. In the RFID tag T9, the semiconductor chip 72 may be disposed between the first feeding pattern 74 and the second feeding pattern 75 and thus, there is no need to form a hole in the conductor layer 99, thereby making the production easy.

Next, a sixth embodiment of the electronic device including the elements of the fourth embodiment and the elements of the second embodiment will be described. In the following description of the sixth embodiment, the same elements as those of the fourth embodiment described above are indicated by the same reference characters as those of the fourth embodiment, and features different from the former embodiments will be described.

Figure 21B:
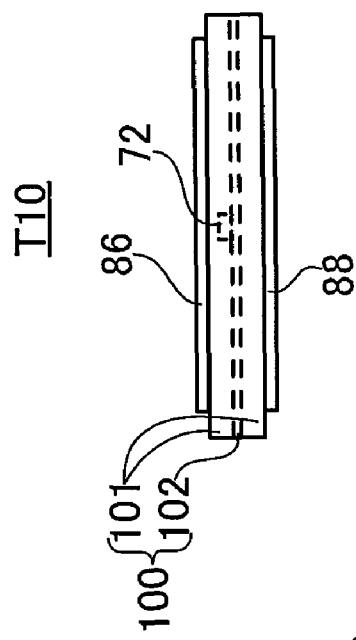
FIGS. 21A and 21B are diagrams that illustrate an RFID tag according to a sixth embodiment of the electronic device.
Figure 21A:
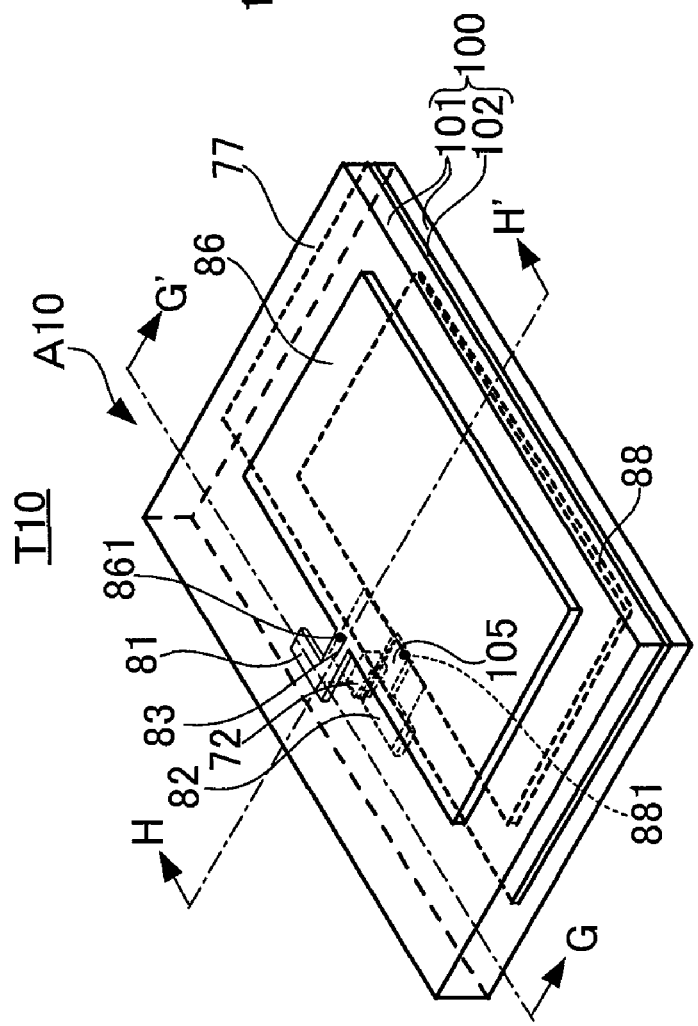
Figure 22:
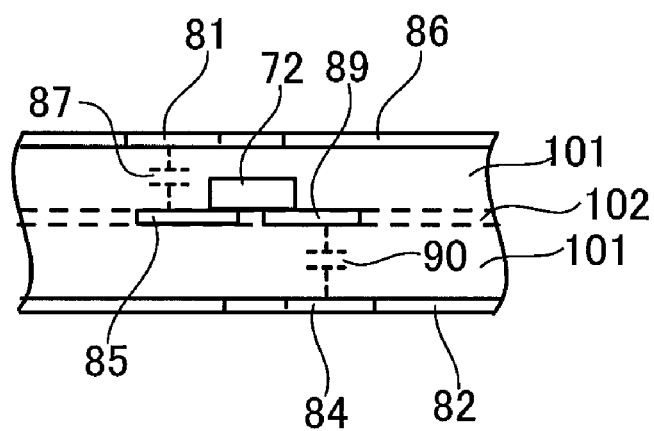
FIG. 22 is a cross-sectional view of the RFID tag taken along a line G-G' illustrated in FIGS. 21A and 21B.
Figure 23:
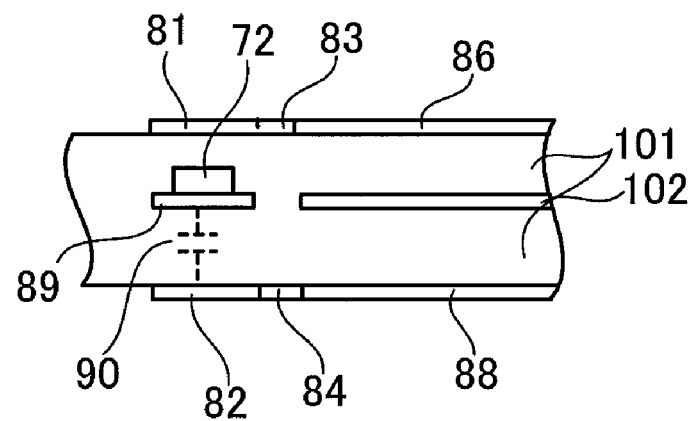
FIG. 23 is a cross-sectional view of the RFID tag taken along a line H-H' illustrated in FIGS. 21A and 21B.

FIGS. 21A and 21B, FIG. 22 and FIG. 23 are diagrams that illustrate an RFID tag according to the sixth embodiment of the electronic device. FIG. 21A is a perspective view and FIG. 21B is a side view of the RFID tag. Further, FIG. 22 is a cross-sectional view of the RFID tag taken along a line G-G' illustrated in FIGS. 21A and 21B, and FIG. 23 is a cross-sectional view of the RFID tag taken along a line H-H' illustrated in FIGS. 21A and 21B.

An RFID tag T10 illustrated in FIG. 21A through FIG. 23 is different from the RFID tag T8 of the fourth embodiment illustrated in FIGS. 15A and 15B, in that the RFID tag T10 includes a conductor layer 102 disposed within a dielectric substrate 100 of an antenna A10. The dielectric substrate 100 has such a structure that the conductor layer 102 is disposed between parts of a dielectric section 101. In the RFID tag T10 as well, the semiconductor chip 72 is disposed on and thereby bridges a first chip mounted electrode 85 and a second chip mounted electrode 89, thereby establishing direct connection without using a lead wire.

Next, there will be described a seventh embodiment of the electronic device, in which the way of attaching a semiconductor chip is different from that of the RFID tag T4 of the first embodiment. In the following description of the seventh embodiment, the same elements as those of the first embodiment described above are indicated by the same reference characters as those of the first embodiment, and features different from the former embodiments will be described.

Figure 24:
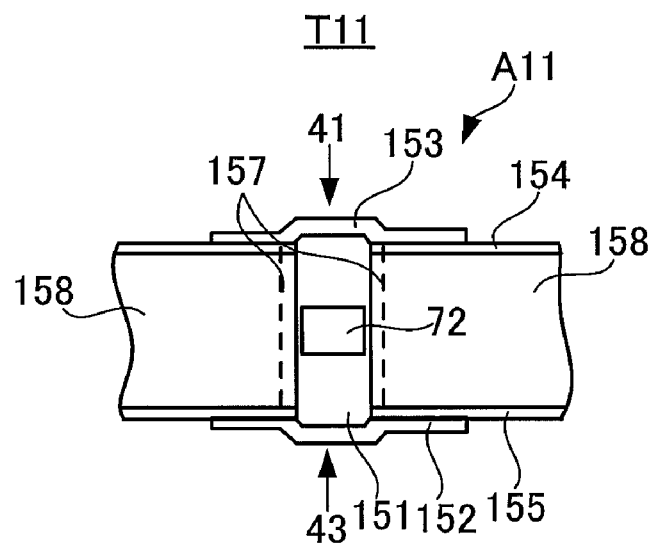
FIG. 24 is a cross-sectional view of an RFID tag according to a seventh embodiment of the electronic device.
Figure 25:
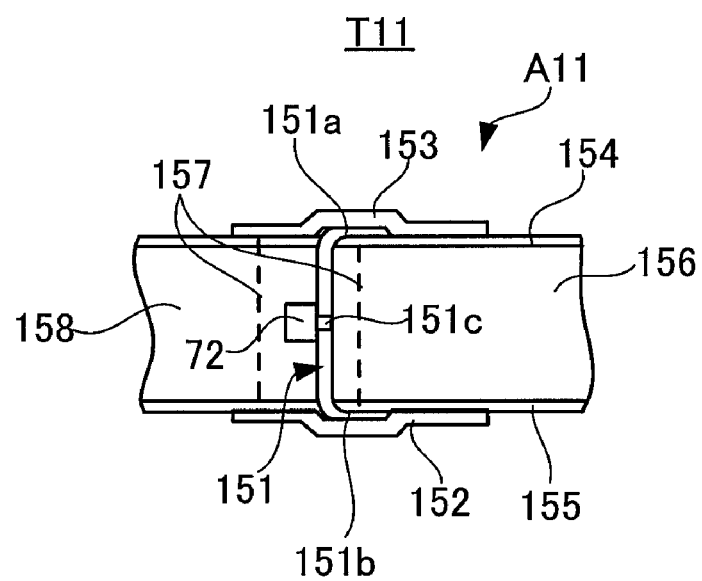
FIG. 25 is a cross-sectional view of the RFID tag, which is perpendicular to the cross section illustrated in FIG. 24.

FIG. 24 and FIG. 25 are cross-sectional views of an RFID tag according to the seventh embodiment of the electronic device. FIG. 24 illustrates a cross section of the RFID tag taken along a line passing through feeding points of an antenna. FIG. 25 illustrates a cross section of the RFID tag taken along a line passing through the feeding points of the antenna and perpendicular to the cross section illustrated in FIG. 24.

An RFID tag T11 illustrated in FIG. 24 includes a semiconductor chip 72 and an antenna A11, and the antenna A11 includes a first antenna element 154, a second antenna element 155 and a dielectric substrate 158, which are features similar to the RFID tag T4 of the first embodiment. However, the RFID tag T11 illustrated in FIG. 24 is different from the RFID tag T4 of the first embodiment, in that the RFID tag T11 has an accommodating hole 157 formed between first and second feeding points 41 and 43 of the antenna and penetrating the first antenna element 154, the dielectric substrate 158 and the second antenna element 155 to accommodate the semiconductor chip 72. Further, within the accommodating hole 157 of the RFID tag T11 illustrated in FIG. 24, a lead electrode member 151 is disposed to bridge the first feeding point 41 and the second feeding point 43, which is a feature different from the RFID tag T4 of the first embodiment. To be more specific, the lead electrode member 151 is integrally formed by sandwiching an insulating section 151c between two electrodes, and includes hook-like sections 151a and 151b provided at both ends to fasten the first feeding point 41 and the second feeding point 43, respectively. To produce the RFID tag T11 illustrated in FIG. 24, at first, the semiconductor chip 72 is attached to the lead electrode member 151 by soldered connection, the lead electrode member 151 to which the semiconductor chip 72 is attached is inserted into the accommodating hole 157, and then the lead electrode member 151 is fixed in the accommodating hole 157 so that the hook-like sections 151a and 151b fasten the first feeding point 41 and the second feeding point 43. Subsequently, an aperture of the accommodating hole 157 is blocked with conductive sealing members 152 and 153. According to the RFID tag T11 in FIG. 24, there is no need to embed the semiconductor chip 72 in the dielectric substrate 158, eliminating a need to use a lead wire, which makes the production easy.

The formation of the accommodating hole and the insertion of the lead electrode member into this accommodating hole are not limited to the case where the feeding point is located in around the middle of the antenna element as illustrated in FIG. 24, and may be applied to a case where the feeding point is located at an edge of the antenna element.

Next, there will be described an eighth embodiment of the electronic device, which is different from the RFID tag T4 of the seventh embodiment, in that the feeding point is located at an edge of an antenna element. In the following description of the eighth embodiment, the same elements as those of the seventh embodiment described above are indicated by the same reference characters as those of the seventh embodiment, and features different from the former embodiments will be described.

Figure 26:
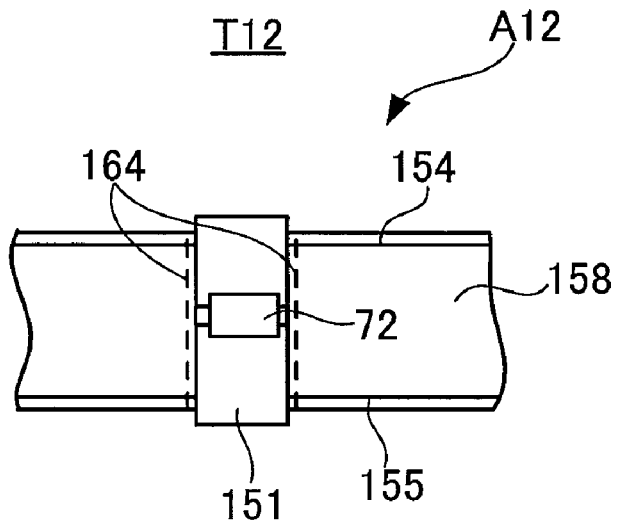
FIG. 26 is a cross-sectional view of an RFID tag according to an eighth embodiment of the electronic device.
Figure 27:
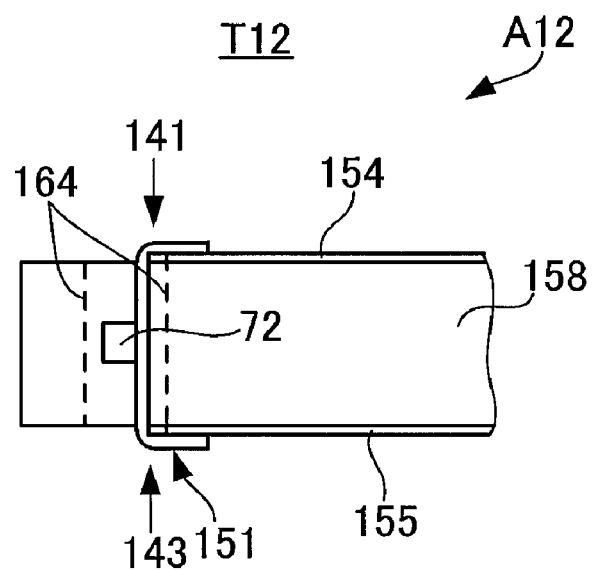
FIG. 27 is a cross-sectional view of the RFID tag, which is perpendicular to the cross section illustrated in FIG. 26.

FIG. 26 and FIG. 27 are cross-sectional views of an RFID tag according to the eighth embodiment of the electronic device. FIG. 26 illustrates a cross section of the RFID tag taken along a line passing through feeding points of an antenna. FIG. 27 illustrates a cross section of the RFID tag taken along a line passing through the feeding points of the antenna and perpendicular to the cross section illustrated in FIG. 26.

In an RFID tag T12 illustrated in FIG. 26 and FIG. 27, a first feeding point 141 and a second feeding point 143 of an antenna A12 are located at an edge of a first antenna element 154 and at an edge of a second antenna element 155, respectively. In this case, an accommodating hole 164 is formed in a part where the antenna elements 154 and 155 are not present. Therefore, the accommodating hole 164 passes through only a dielectric substrate 158. To produce the RFID tag T12 illustrated in FIG. 26, at first, a semiconductor chip 72 is attached to a lead electrode member 151 by soldered connection, the lead electrode member 151 to which the semiconductor chip 72 is attached is inserted into the accommodating hole 164, and the lead electrode member 151 is fixed in the accommodating hole 64 so that both ends of the lead electrode member 151 fasten the first feeding point 141 and the second feeding point 143. Subsequently, an aperture of the accommodating hole 164 may be blocked with a conductive sealing member or subjected to soldered connection. In the RFID tag T12 illustrated in FIG. 26 and FIG. 27, there is no need to form a hole in the first antenna element 154 and the second antenna element 155.

The basic aspect and application of the electronic device, the antenna and the article described above in the embodiments may be applied to a structure in which the area of the antenna element is halved by providing a short-circuit section.

Figure 28:
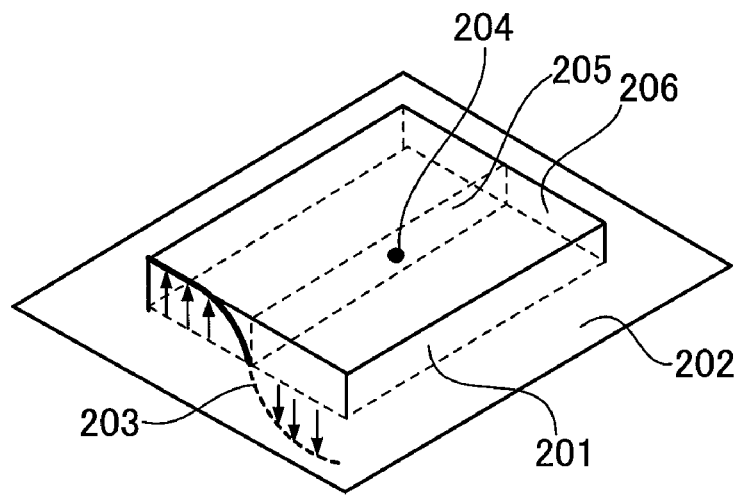
FIG. 28 is a schematic diagram for describing a conventional general microstrip antenna.

FIG. 28 is a schematic diagram for describing a conventional general microstrip antenna.

A microstrip antenna A13 illustrated in FIG. 28 has such a structure that a dielectric substrate 201 is interposed between an antenna element 206 and a ground 202, the antenna element 206 is provided with a feeding point 204 located off the center. When the feeding point 204 is supplied with a signal, the electric field of the antenna element 206 turns as illustrated in a graph 203. At this time, the electric field of a central portion of the antenna element 206 remains unchanged at zero and thus, even if connection with the ground 202 is established, no change occurs in frequency response. Therefore, a short-circuit plate that bridges the antenna element 206 and the ground 202 is disposed at a position 205 of a central part of the antenna element 206, so that the area of the antenna element 206 may be halved.

Figure 29:
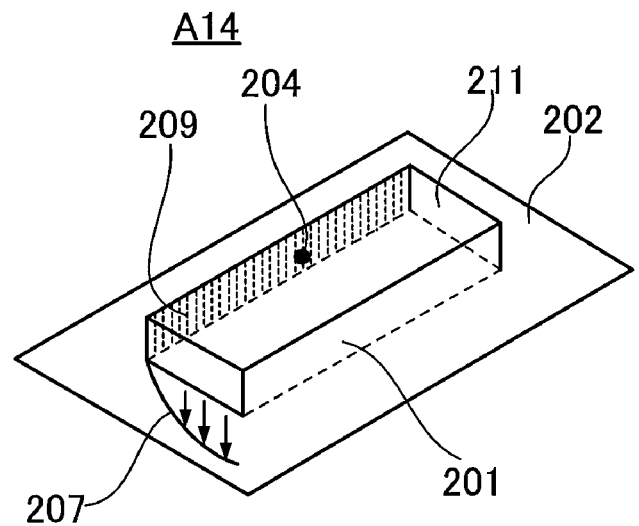
FIG. 29 is a schematic diagram for describing the antenna whose area is halved by providing the microstrip antenna illustrated in FIG. 28 with the short-circuit plate.

FIG. 29 is a schematic diagram for describing the antenna whose area is halved by providing the microstrip antenna illustrated in FIG. 28 with the short-circuit plate.

An antenna A14 illustrated in FIG. 29 includes a short-circuit plate 209 having a pattern and thus, the area of an antenna element 211 is half the antenna illustrated in FIG. 28. As illustrated in a graph 207, the electric field of the antenna A14 may keep the same frequency response as that of the antenna illustrated in FIG. 28.

Figure 30:
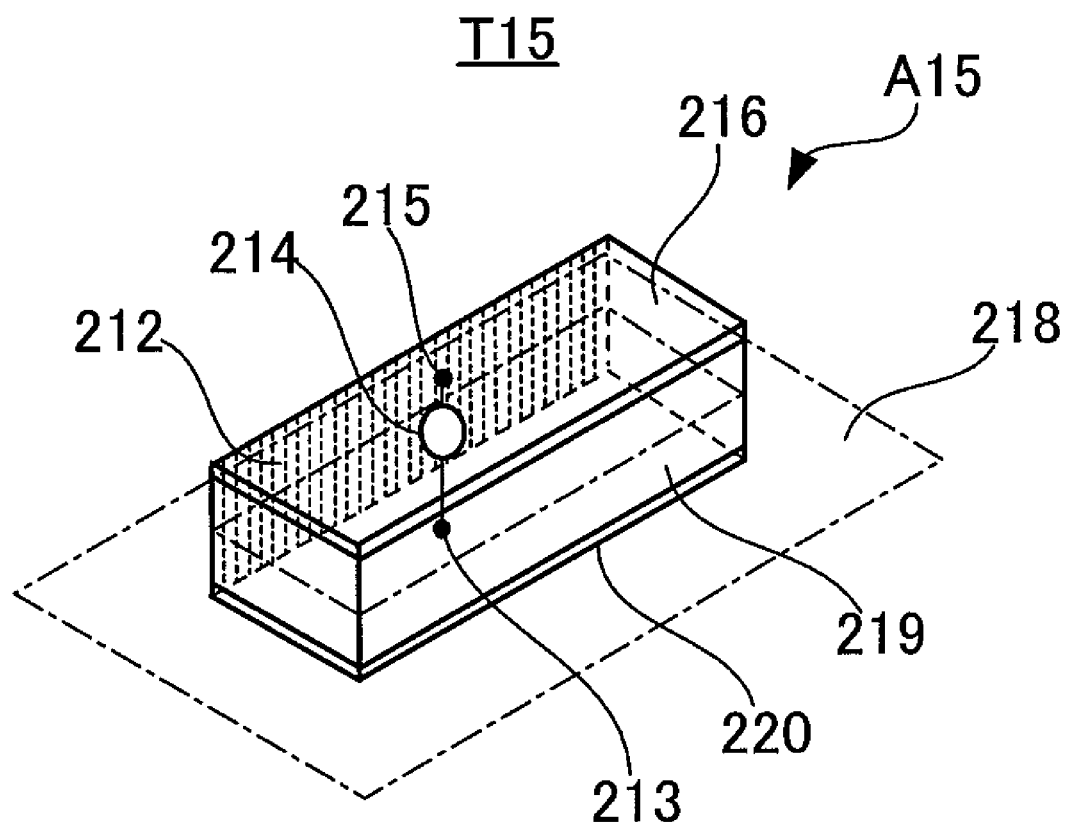
FIG. 30 is a cross-sectional view of an RFID tag according to a ninth embodiment of the electronic device.

FIG. 30 is a cross-sectional view of an RFID tag according to a ninth embodiment of the electronic device.

An RFID tag T15 illustrated in FIG. 30 includes an antenna A15, feeding points 213, 215 and a semiconductor chip 214 wirelessly communicating with the outside through the antenna A15. The antenna A15 is also called a rectangular patch antenna with a short-circuit plate, and includes a first antenna element 216 spreading flatly, a second antenna element 220 facing the first antenna element 216 while spreading flatly, and a dielectric substrate 219 shaped like a plate and interposed between the first antenna element 216 and the second antenna element 220. The thickness of the dielectric substrate 219 is twice the thickness of the dielectric substrate 201 in the microstrip antenna illustrated in FIG. 29. The first antenna element 216 and the second antenna element 220 are disposed to be symmetric with respect to a virtual symmetry plane 218 located at a midpoint between the first antenna element 216 and the second antenna element 220. Further, the antenna A15 of the RFID tag T15 includes a short-circuit section 212 that bridges a part of the edge of the first antenna element 216 and a part of the edge of the second antenna element 220 while being symmetric with respect to the symmetry plane 218. To be more specific, the short circuit section 212 bridges a part of the edge of the first antenna element 216 and a part of the edge of the second antenna element 220, which parts are symmetric with respect to the symmetry plane 218.

The communication property of the RFID tag T15 illustrated in FIG. 30 is not easily affected by the material of an article to which the RFID tag T15 is attached, and even if the main body of the article is made of metal, deterioration of the property is suppressed. Moreover, the size may be further reduced.

A planar inverted F antenna is known as an application achieved by further developing the rectangular patch antenna with the short-circuit plate illustrated in FIG. 29.

Figure 31:
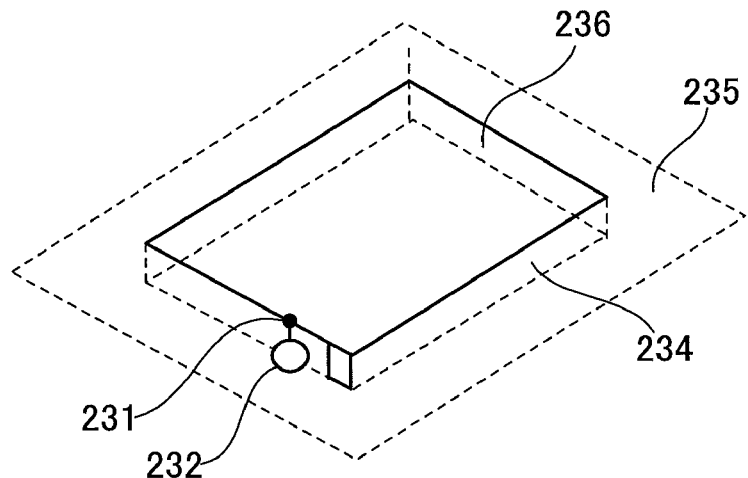
FIG. 31 is a schematic diagram for describing a conventional general planar inverted F antenna.

FIG. 31 is a schematic diagram for describing a conventional general planar inverted F antenna.

An antenna A16 illustrated in FIG. 31 has such a structure that a dielectric section 234 is interposed between an antenna element 236 and a ground 235, and a part of the edge of the antenna element 236 is connected to the ground 235. To a feeding point 231 in the antenna element 236, a signal is supplied from the semiconductor chip 232. In the planar inverted F antenna, the dielectric section may be air.

Figure 32:
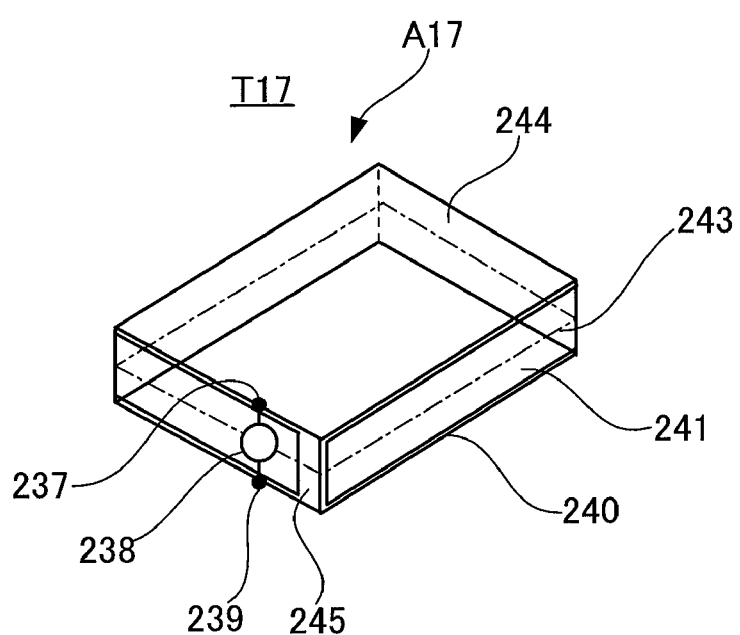
FIG. 32 is a cross-sectional view of an RFID tag according to a tenth embodiment of the electronic device.

FIG. 32 is a cross-sectional view of an RFID tag according to a tenth embodiment of the electronic device.

An RFID tag T17 illustrated in FIG. 32 includes an antenna A17, feeding points 237, 239 and a semiconductor chip 238 wirelessly communicating with the outside through the antenna A17. The antenna A17 has such a structure that two planar inverted F antennas are symmetrical. The antenna A17 includes a first antenna element 244 spreading flatly, a second antenna element 240 facing the first antenna element 244 while spreading flatly, and a dielectric 241 provided between the first antenna element 244 and the second antenna element 240. Here however, the dielectric 241 is air. The first antenna element 244 and the second antenna element 240 are symmetric with respect to a symmetry surface 243. Further, the antenna A17 of the RFID tag T17 includes a short-circuit section 245 that bridges a part of the edge of the first antenna element 244 and a part of the second antenna element 240, which parts are symmetric with respect to the symmetry surface 243.

The communication property of the RFID tag T17 illustrated in FIG. 32 is not easily affected by the material of an article to which the RFID tag T17 is attached and thus, deterioration of the property is suppressed even when the main body of the article is made of metal. Moreover, the size may be further reduced.

A belt-shaped inverted F antenna is known as an application achieved by further developing the planar inverted F antenna illustrated in FIG. 31.

Figure 33:
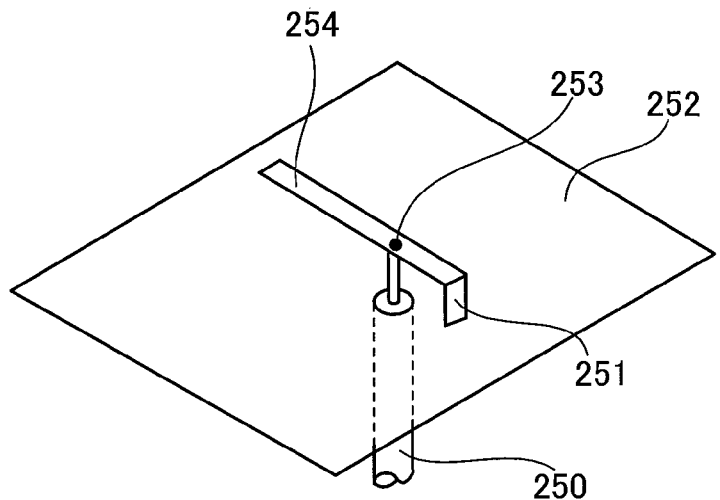
FIG. 33 is a schematic diagram for describing a conventional general belt-shaped inverted F antenna.

FIG. 33 is a schematic diagram for describing a conventional general belt-shaped inverted F antenna.

An antenna A18 illustrated in FIG. 33 includes a feeder line 250, a ground 252 and an antenna element 254 disposed in approximately parallel with the ground 252. An edge of the antenna element 254 is connected to the ground 252 by a short-circuit section 251. A signal is supplied to a feeding point 253 in the antenna element 254.

Figure 34:
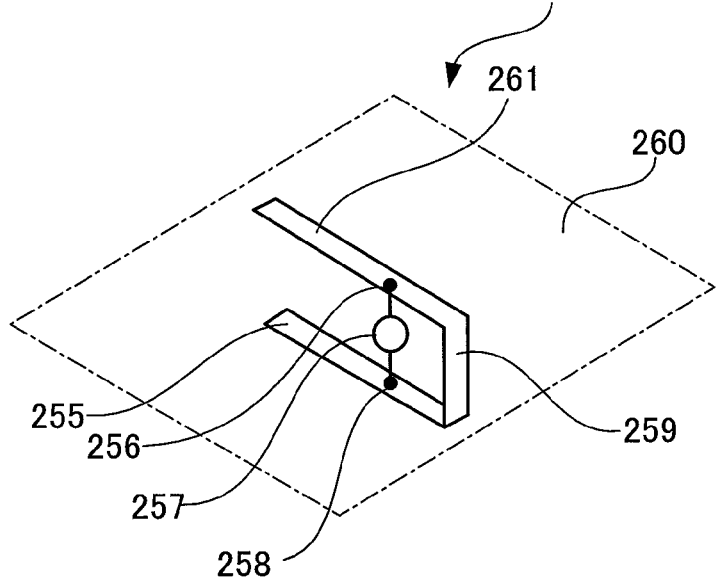
FIG. 34 is a cross-sectional view of an RFID tag according to an eleventh embodiment of the electronic device.

FIG. 34 is a cross-sectional view of an RFID tag according to an eleventh embodiment of the electronic device.

An RFID tag T19 illustrated in FIG. 34 includes an antenna A19 and a semiconductor chip 257 communicating with the outside through the antenna A19. The antenna A19 has such a structure that two belt-shaped inverted F antennas are symmetrical. The antenna A19 includes a first antenna element 261 having a small thickness and spreading flatly like a belt, a second antenna element 255 facing the first antenna element 261 and spreading like a belt. The first antenna element 261 and the second antenna element 255 are symmetric with respect to a symmetry plane 260, and the first antenna element 261 and the second antenna element 255 include feeding points 256 and 258 provided at positions symmetric with respect to the symmetry plane 260, respectively. Further, the antenna A19 of the RFID tag T19 includes a short-circuit section 259 that bridges a part of the edge of the first antenna element 261 and a part of the edge of the second antenna element 255, which parts are symmetric with respect to the symmetry plane 260.

The communication property of the RFID tag T19 illustrated in FIG. 34 is not easily affected by the material of an article to which the RFID tag T19 is attached and thus, deterioration of the property is suppressed even when the main body of the article is made of metal.

Incidentally, in the above description of the embodiments, the RFID tag is used as an example of the electronic device according to the basic aspect described above in SUMMARY, but this electronic device may be any of various kinds of device communicating wirelessly, other than the RFID tag.

Further, in the above description of the embodiments, the rectangular-shaped or belt-shaped antenna element is used as an example of the first conductor section and the second conductor section according to the basic aspect described above in SUMMARY, but this conductor section may be in any shape such as a circle, other than the rectangle and the belt.

Furthermore, in the above description of the embodiments, the metallic ornament is used as an example of the article main body according to the basic aspect described above in SUMMARY, but this article main body may be any of various kinds of object such as a non-metal ornament, an everyday item, a household electric appliance or device, an industrial machine or device, a component, a piece of clothing, a food product, and a package, other than the metallic ornament.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device, comprising:
an antenna, comprising:
    a first conductor section that includes a first feeding point and spreads flatly, and
    a second conductor section that is same in size and form as the first conductor section and includes a second feeding point and spreads flatly while facing the first conductor section, the first conductor section and the second conductor section being disposed so as to be symmetric with each other about a plane, including a position of the first feeding point and a position of the second feeding point; and
a semiconductor element that supplies the first feeding point and the second feeding point with signals opposite to each other in polarity, respectively, thereby communicating via the antenna.

2. The electronic device according to claim 1, wherein the antenna comprises a dielectric section shaped like a plate and interposed between the first conductor section and the second conductor section.

3. The electronic device according to claim 2, wherein the dielectric section has a hole between the first feeding point in the first conductor section and the second feeding point in the second conductor section, and
    the semiconductor element is accommodated in the hole.

4. The electronic device according to claim 1, wherein the antenna comprises:
    a dielectric section shaped like a plate and interposed between the first conductor section and the second conductor section; and
    a conductor layer disposed in the dielectric section and located at a midpoint between the first conductor section and the second conductor section.

5. The electronic device according to claim 1, wherein the first conductor section includes the first feeding point at an edge of the first conductor section that spreads flatly,
    the second conductor section includes the second feeding point at an edge of the second conductor section that spreads flatly, and
    the antenna comprises:
        a first feeding pattern that protrudes from the first feeding point toward outside the first conductor section and transmits a signal to the first feeding point, and
        a second feeding pattern that protrudes from the second feeding point toward outside the second conductor section and transmits a signal to the second feeding point.

6. The electronic device according to claim 5, wherein the first feeding pattern protrudes from the first feeding point toward outside the first conductor section, is supplied with a signal via a capacitance, and transmits the signal to the first feeding point, and
    the second feeding pattern protrudes from the second feeding point toward outside the second conductor section, is supplied with a signal via a capacitance, and transmits the signal to the second feeding point.

7. The electronic device according to claim 6, further comprising:
    a first element connection section that has a part disposed to face the first feeding pattern, thereby being electrically connected to the first feeding pattern via the capacitance and supplying a signal emitted from the semiconductor element to the first feeding pattern; and
    a second element connection section that is disposed to face the second feeding pattern and align with the first element connection section, thereby being electrically connected to the second feeding pattern via the capacitance and supplying a signal emitted from the semiconductor element to the second feeding pattern,
    wherein the semiconductor element bridges the first element connection section and the second element connection section.

8. The electronic device according to claim 1, further comprising:
    a short-circuit section that bridges a part of an edge of the first conductor section and a part of an edge of the second conductor section, which parts are symmetric with respect to a symmetry plane, with respect to which the first conductor section and the second conductor section are symmetric.

9. An antenna, comprising:
    a first conductor section that includes a first feeding point and spreads flatly; and
    a second conductor section that is same in size and form as the first conductor section and includes a second feeding point and spreads flatly while facing the first conductor section, the second conductor section including the second feeding point and the first conductor section including the first feeding point being symmetric with each other about a plane, wherein
the first feeding point and the second feeding point are supplied with signals opposite to each other in polarity, respectively.

10. An article, comprising:
an article main body; and
an electronic device that is attached to the article main body, and transmits and receives information representing an attribute of the article main body to and from outside,
wherein the electronic device comprises:
an antenna, comprising:
   a first conductor section that includes a first feeding point and spreads flatly, and
   a second conductor section that is same in size and form as the first conductor section and includes a second feeding point and spreads flatly while facing the first conductor section, the first conductor section and the second conductor section being disposed so as to be symmetric with each other about a plane, including a position of the first feeding point and a position of the second feeding point; and
a semiconductor element that supplies the first feeding point and the second feeding point with signals opposite to each other in polarity, respectively, thereby communicating via the antenna.

\* \* \* \* \*